(12) United States Patent
Brockhoff

(10) Patent No.: US 7,677,635 B2
(45) Date of Patent: *Mar. 16, 2010

(54) CONVERTIBLE VEHICLE

(75) Inventor: Franz-Ulrich Brockhoff, Bramsche (DE)

(73) Assignee: Wilhelm Karmann GmbH, Osnabrueck ( * ) Notice: Subject to any disclaimer, the term of this patent is extended or adjusted under 35 U.S.C. 154(b) by 624 days.

This patent is subject to a terminal disclaimer.

(21) Appl. No.: 11/568,576

(22) PCT Filed: Apr. 30, 2005

(86) PCT No.: PCT/DE2005/000806

§ 371 (c)(1),
(2), (4) Date: Nov. 17, 2006

(87) PCT Pub. No.: WO2005/105498

PCT Pub. Date: Nov. 10, 2005

(65) Prior Publication Data

US 2007/0187984 A1    Aug. 16, 2007

(30) Foreign Application Priority Data

May 3, 2004    (DE) .................. 10 2004 021 576

(51) Int. Cl.
*B60J 7/08*    (2006.01)
*B60J 7/14*    (2006.01)

(52) U.S. Cl. ............ 296/108; 296/107.09; 296/107.16; 296/121

(58) Field of Classification Search ............. 296/108, 296/107.07, 107.08, 107.09, 107.11, 107.15, 296/121

See application file for complete search history.

(56) References Cited

U.S. PATENT DOCUMENTS

| 5,520,432 | A  | * | 5/1996 | Gmeiner et al. | ........ 296/107.01 |
| 6,550,842 | B1 | * | 4/2003 | Halbweiss et al. | ........ 296/116 |
| 6,585,310 | B1 |   | 7/2003 | Guillez et al. | |
| 6,623,065 | B2 | * | 9/2003 | Halbweiss et al. | ........ 296/122 |

(Continued)

FOREIGN PATENT DOCUMENTS

DE    19706397 C1    6/1998

(Continued)

*Primary Examiner*—Patricia L Engle
(74) *Attorney, Agent, or Firm*—Quinn Law Group, PLLC

(57) ABSTRACT

A convertible vehicle is provided with a rear windshield and a rear roof element that laterally comprises C pillars that are at least substantially located next to the rear windshield, adjoining which is at least one front roof element, arranged upstream thereof in the direction of travel when the roof is closed. In order to open the roof the rear roof element can move rearward and downward, and the front roof element can swivel toward the rear roof element. When the roof is open, the C pillars can be swiveled inward in relation to a center section comprising the windshield about axes into a position lying above the center position when the roof is open, and the axes when the roof is closed have at least one component in the direction of travel and one upwardly directed component.

12 Claims, 30 Drawing Sheets

U.S. PATENT DOCUMENTS

| | | | |
|---|---|---|---|
| 6,814,391 B2 * | 11/2004 | Biecker et al. | 296/108 |
| 6,843,523 B2 * | 1/2005 | Nania | 296/136.05 |
| 7,344,180 B2 * | 3/2008 | Halbweiss et al. | 296/108 |
| 7,594,685 B2 * | 9/2009 | Brockhoff | 296/24.44 |
| 2002/0105206 A1 * | 8/2002 | Neubrand | 296/107.07 |
| 2002/0185885 A1 * | 12/2002 | Biecker et al. | 296/108 |
| 2008/0093880 A1 * | 4/2008 | Westermann et al. | 296/107.17 |
| 2008/0203758 A1 * | 8/2008 | Brockhoff | 296/107.07 |
| 2009/0160207 A1 * | 6/2009 | Neubrand | 296/65.01 |

FOREIGN PATENT DOCUMENTS

| | | |
|---|---|---|
| DE | 10213836 A1 | 10/2002 |
| DE | 10147015 C2 | 8/2003 |
| JP | 1111525 A | 4/1989 |

* cited by examiner

C Pillar Hidden

CONVERTIBLE VEHICLE

CROSS-REFERENCE TO RELATED APPLICATION(S)

This application is a US National Phase of International Application No. PCT/DE 2005/000806, filed Apr. 30, 2005 which claims priority to German 10 2004 021 576.6, filed May 3, 2004. The entire contents of the above identified applications are incorporated herein by reference.

TECHNICAL FIELD

The invention concerns a convertible vehicle with at least two roof elements as well as a corresponding roof.

BACKGROUND OF THE INVENTION

There are known convertible vehicles, which have two consecutive roof elements in the closed condition, one of which, the rear element, can swivel downwards about a transverse axis in relation to the car body, so that in the stowed-away condition it lies essentially horizontal and with its side facing the passenger compartment pointing upward when the roof is closed. The front roof element when opening the roof can swivel onto the rear roof element about a second transverse axis situated in the boundary region between the roof elements and in the opened state it is oriented in opposite sense to the former.

DE 102 13 836 A1 reveals C pillars which are separated by a rear windshield of the rear roof element, and in certain sample embodiments these can be shifted inwards, parallel to the rear windshield and oriented in the same direction as it. But for this, one needs to provide either guide rails, compound joints, or the like, as well as corresponding drive elements, lying at least for the most part inside the C pillars and considerably increasing their thickness dimension, and thereby limiting the free headroom for the passengers. Furthermore, these mechanical parts are visible on the inside and have to be paneled at added expense. When moved inwards in the direction of the vertical longitudinal midplane of the vehicle, the C pillars are moved on the outside over the rear windshield, so that the stowed-away roof package requires a larger height dimension than without the C pillars moving and therefore it further restricts the remaining trunk space.

DE 101 47 015 C2, in which a central roof segment can move upwards and is suspended from side-mounted C pillars, also discloses C pillars projecting far into the trunk space when the roof is stowed away, thereby restricting the space and also presenting a risk, for example, of luggage being pushed in and scratching their outer surfaces, resulting in visible damage when the roof is closed.

SUMMARY OF THE INVENTION

The basic problem of the invention is to achieve an improvement here.

Thanks to the invention, when the roof is opened the C pillars lie on top of the rear windshield, so that the dimension of the stowed-away roof package is not increased downward. Since the front roof element is curved and oriented opposite in trend to the rear roof element in the stowed-away condition any way, there is enough room available for the swiveled-in C pillars without having to increase the thickness of the stowed-away roof package. In particular, the C pillars can swivel into the empty space between oppositely curved roof elements.

The roof package is much more narrow than that of fixed C pillars, so that the roof stowage space is narrowed and the edge joint of a hood cover can be moved substantially toward the middle of the vehicle, which improves the design qualities of the vehicle. The swivel-in movement of the C pillars, furthermore, is possible by pivot axes with slight mechanical effort. At the same time, the package of stowed-away roof elements is also more flat, so that the tail end of the vehicle can also have a more flat and visually pleasing design. The rear windshield, less vulnerable than painted parts, projects downward, so that the risk of the roof getting damaged by luggage pushed into the trunk is minimized.

Very advantageously, the pivot axes lie parallel to the plane of the rear roof element, so that they can be fitted flat against this and project only slightly in the direction of the passenger compartment. In particular, the axis can be interrupted, with torque transmitted in the middle region by the C pillars themselves, and these have only stub axes on top and bottom, which do not interfere with the passenger compartment.

C pillars hung from the central roof segment can have a lower weight and be formed, for example, from a light construction material. They themselves need not perform any load bearing function. The kinematics for swiveling the suspended C pillars can also be configured more simple, so that the C pillars are forced to swivel when the roof is opened or closed, with no additional control or drive elements.

A particular reduction in the parts required for the roof movement and a simplification of the motion mechanism results when the pivot axes of the C pillars are enclosed for at least part of their region by drive shafts, which can mediate the swiveling of the front roof element via the rotary movement of the C pillars. In particular, the front main guide rod, which would otherwise run between the main bearing and the front roof element, can then be omitted, which produces a significant design improvement and lessens the risk of jamming. Furthermore, no separate parts are then required for the rotary movement of the C pillars.

In particular, a reliable kinematics, operating solely through swivel connections with no risk of skewing, will result if the rear roof element for its swivel movement can swivel about a first axis lying transverse to the vehicle, the front roof element can swivel relative to the rear roof element about a second axis lying parallel to the latter, and the pivot axes of the C pillars link both swivel axes.

Also, in this case, every other drive unit can be dispensed with, except for the drive for the swiveling of the rear roof element relative to the car body.

A broad rear windshield, whose clear width is not cut down by the axes of the C pillars, is made possible when these have brackets pointing toward the vertical longitudinal midplane of the vehicle in the upper and lower region, through which the pivot axes travel, while the C pillars run further on the outside with their edges facing the center of the vehicle for a middle portion of their dimension in terms of the vertical.

Additional advantages and features of the invention will result from sample embodiments of the object of the invention, shown schematically in the drawing and described hereafter.

BRIEF DESCRIPTION OF THE DRAWINGS

The drawing shows:

FIG. 1 is the vehicle with the roof closed, FIG. 2 is a view similar to FIG. 1 with pivot axis of the C pillars also drawn in, FIG. 3 is a view similar to FIG. 1 with roof still closed and rear cover already opened to free up an entry opening for the roof, FIG. 4 is a view similar to FIG. 3 with pivot axis of the C pillars also drawn in, FIG. 5 is a view similar to FIG. 3 with opening of the roof commencing, FIG. 6 is a view similar to FIG. 5 with pivot axis of the C pillars also drawn in, FIG. 7 is a view similar to FIG. 5 with opening of the roof continuing further, FIG. 8 is a view similar to FIG. 7 with pivot axis of the C pillars also drawn in, FIG. 9 is a view similar to FIG. 7, with roof opened and rear cover still opened, FIG. 10 is a view similar to FIG. 9 with pivot axis of the C pillars also drawn in, FIG. 11 is a view similar to FIG. 9 with roof fully opened, FIG. 12 is a view similar to FIG. 11 with pivot axis of the C pillars also drawn in, FIGS. 7 and 16, FIG. 25A and FIG. 25B are detail views of the upper and lower three-dimensional link mechanism in this position, FIGS. 9 and 18, FIG. 27A and FIG. 27B are detail views of the upper and lower three-dimensional link mechanism in this position.

DESCRIPTION OF THE PREFERRED EMBODIMENTS

Figure 1:
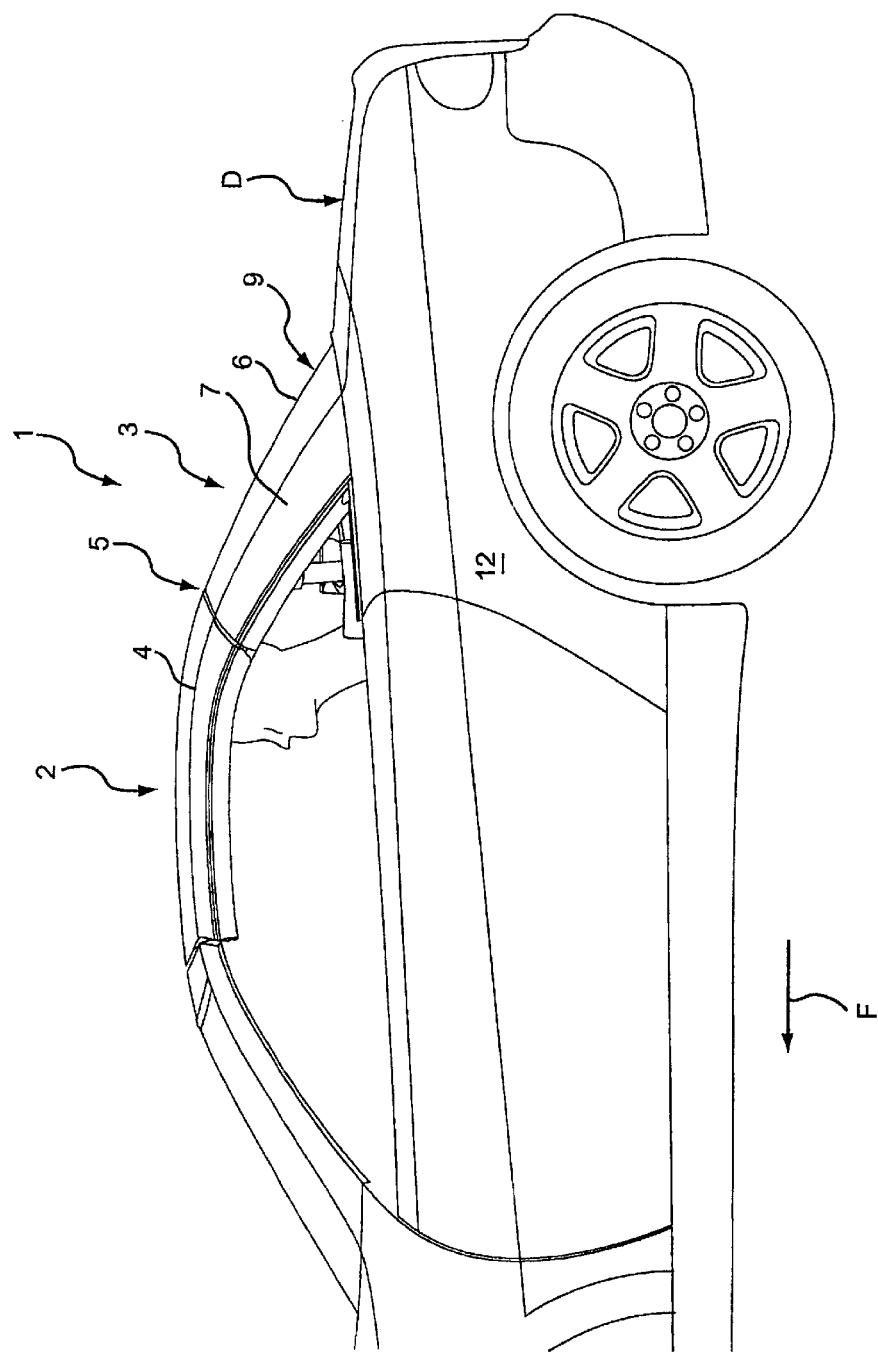
FIG. 1 to FIG. 12, the phases of the roof opening of a convertible vehicle according to the invention in a side view broken off in the front region, where
Figure 2:
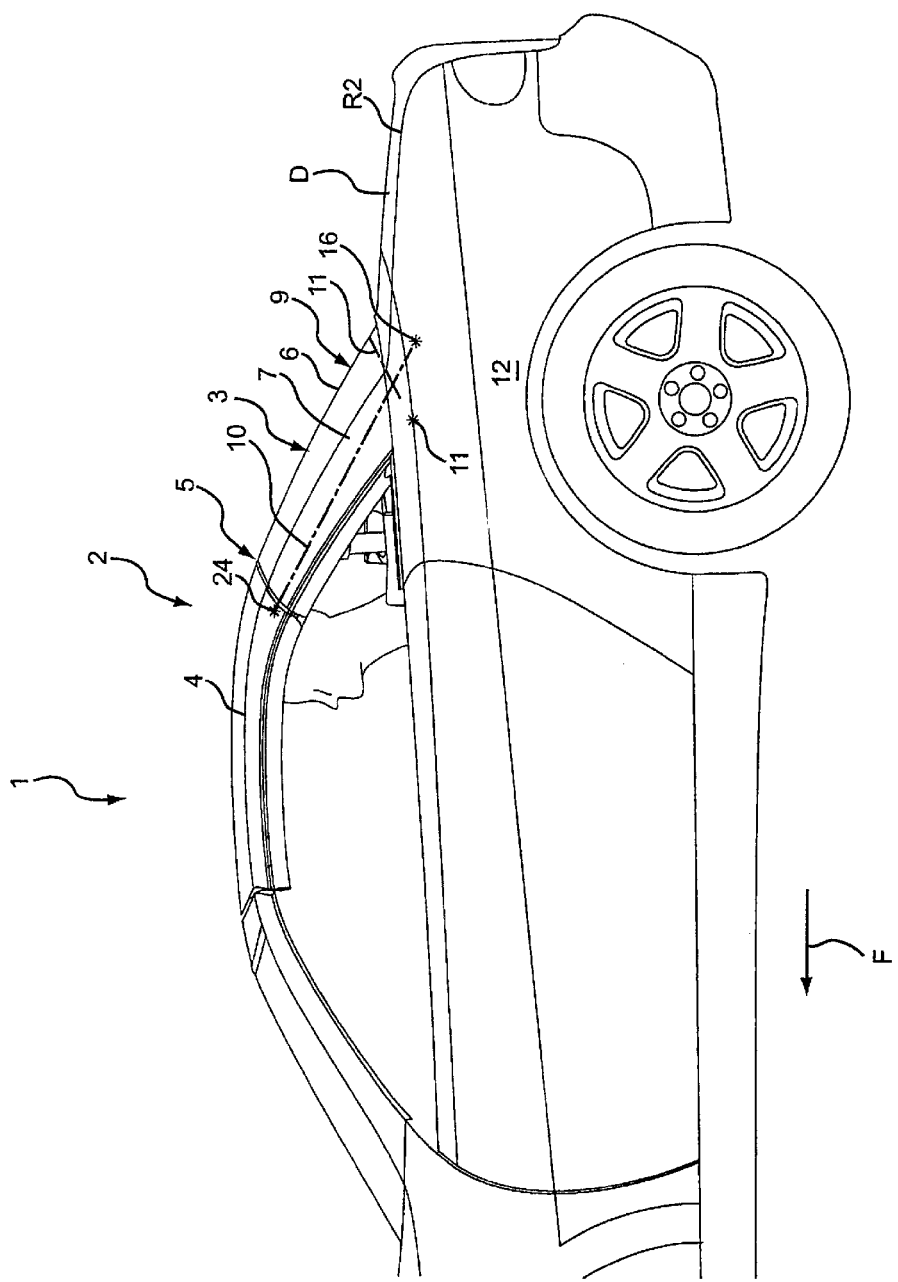
Figure 3:
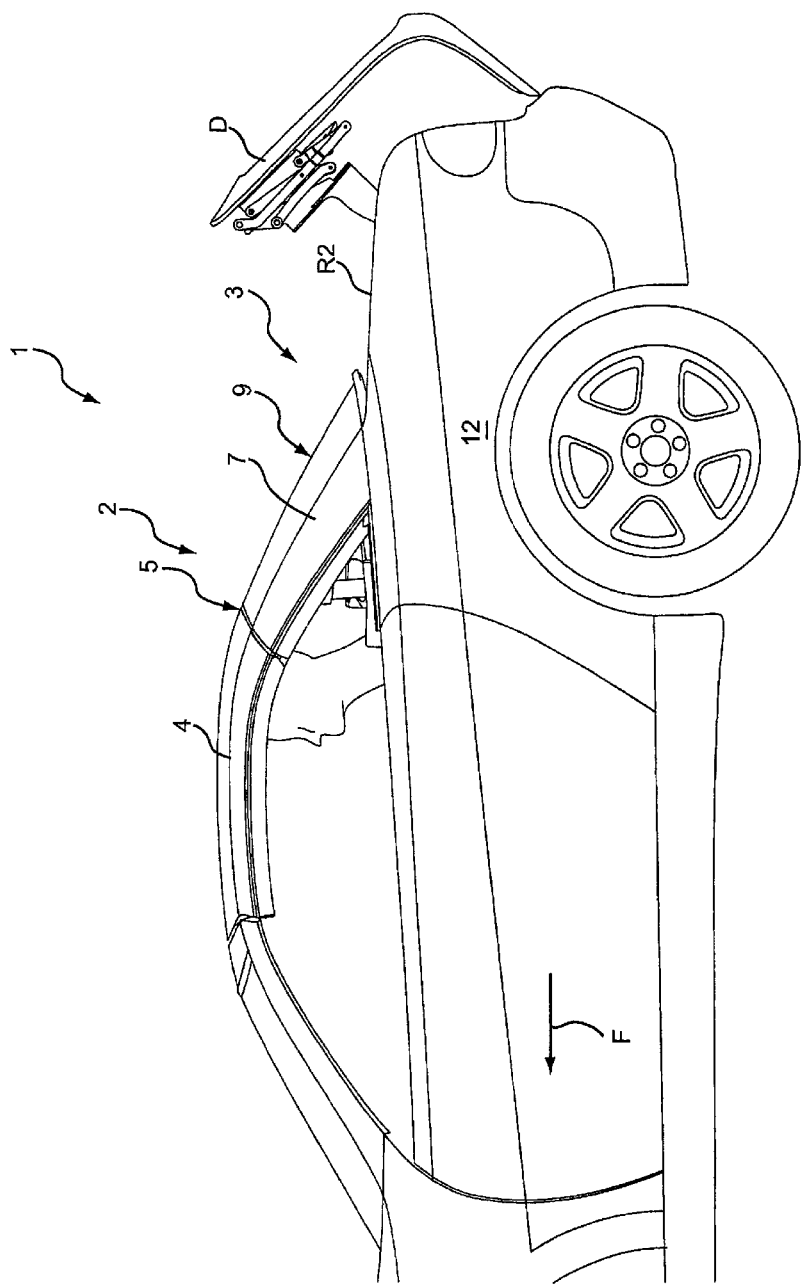
Figure 4:
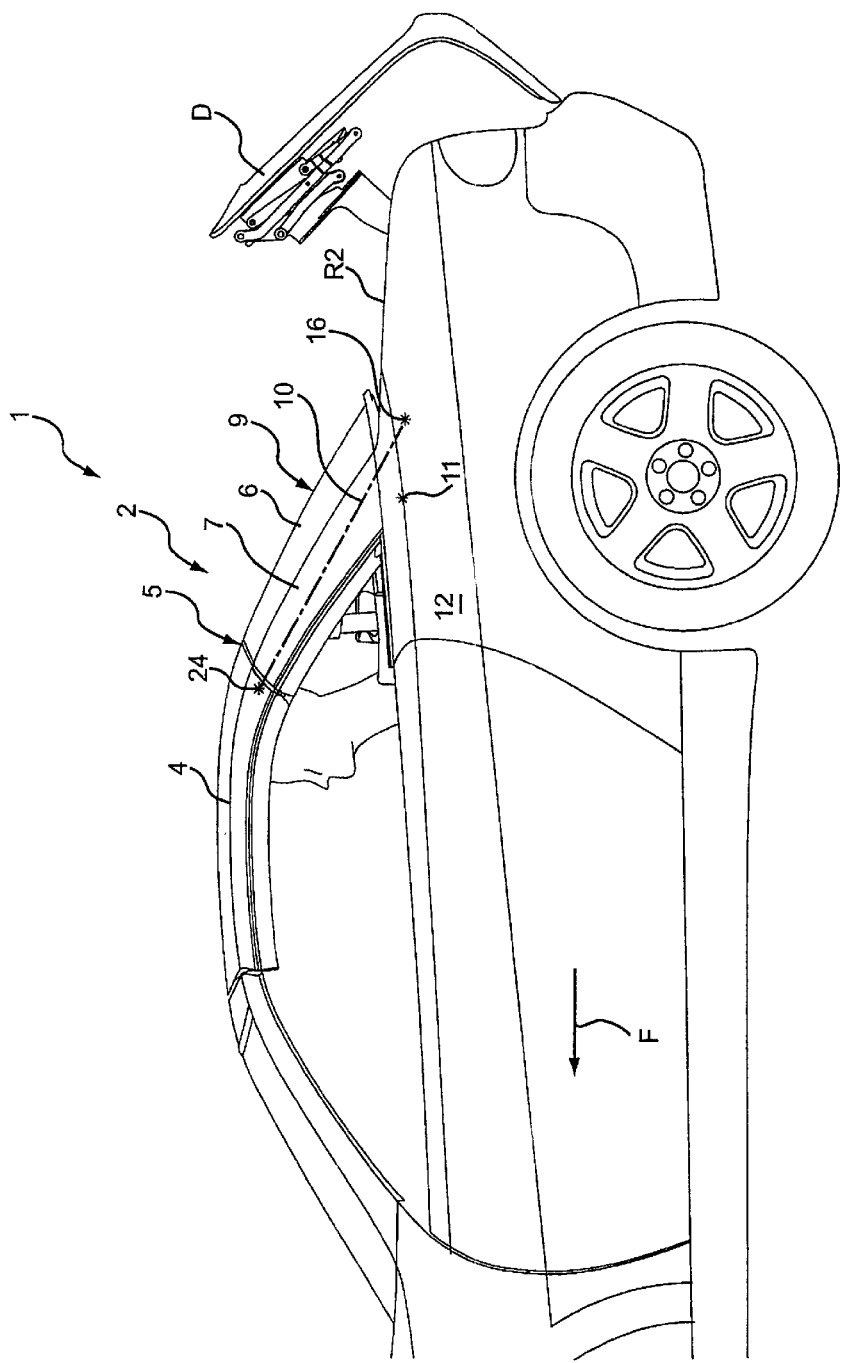
Figure 5:
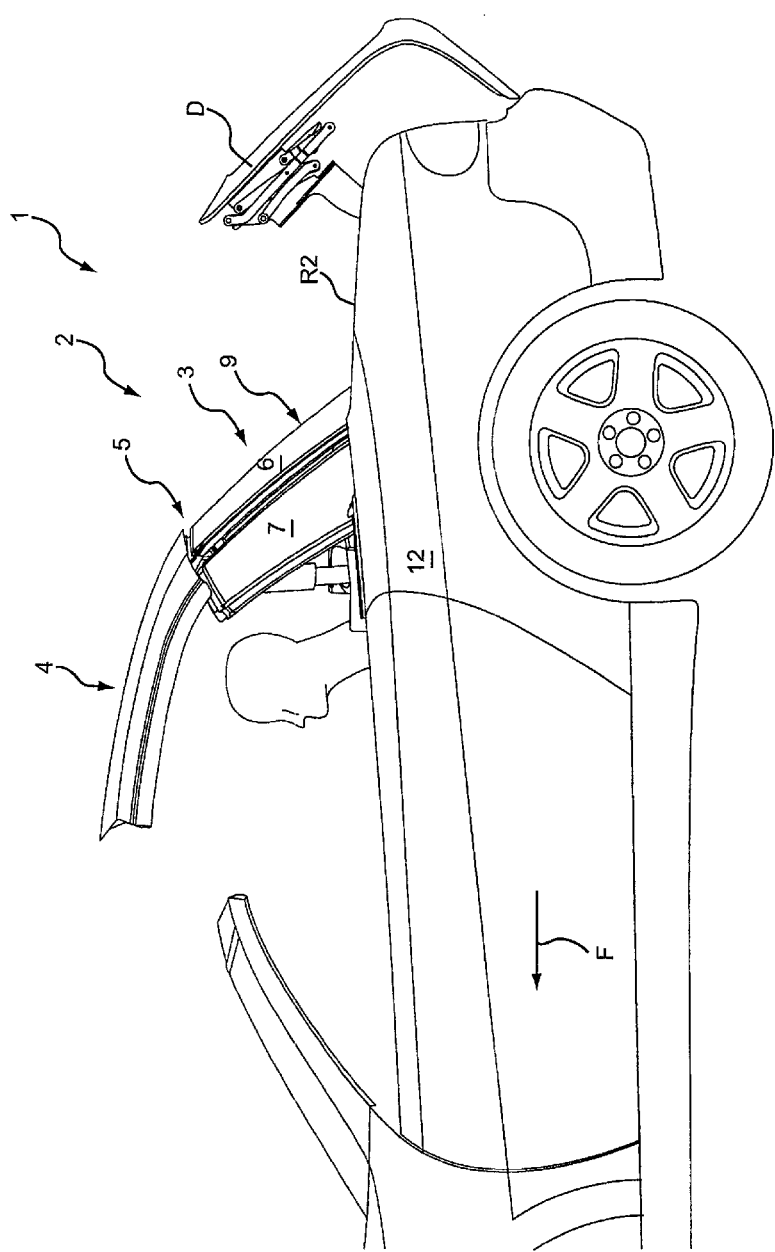
Figure 6:
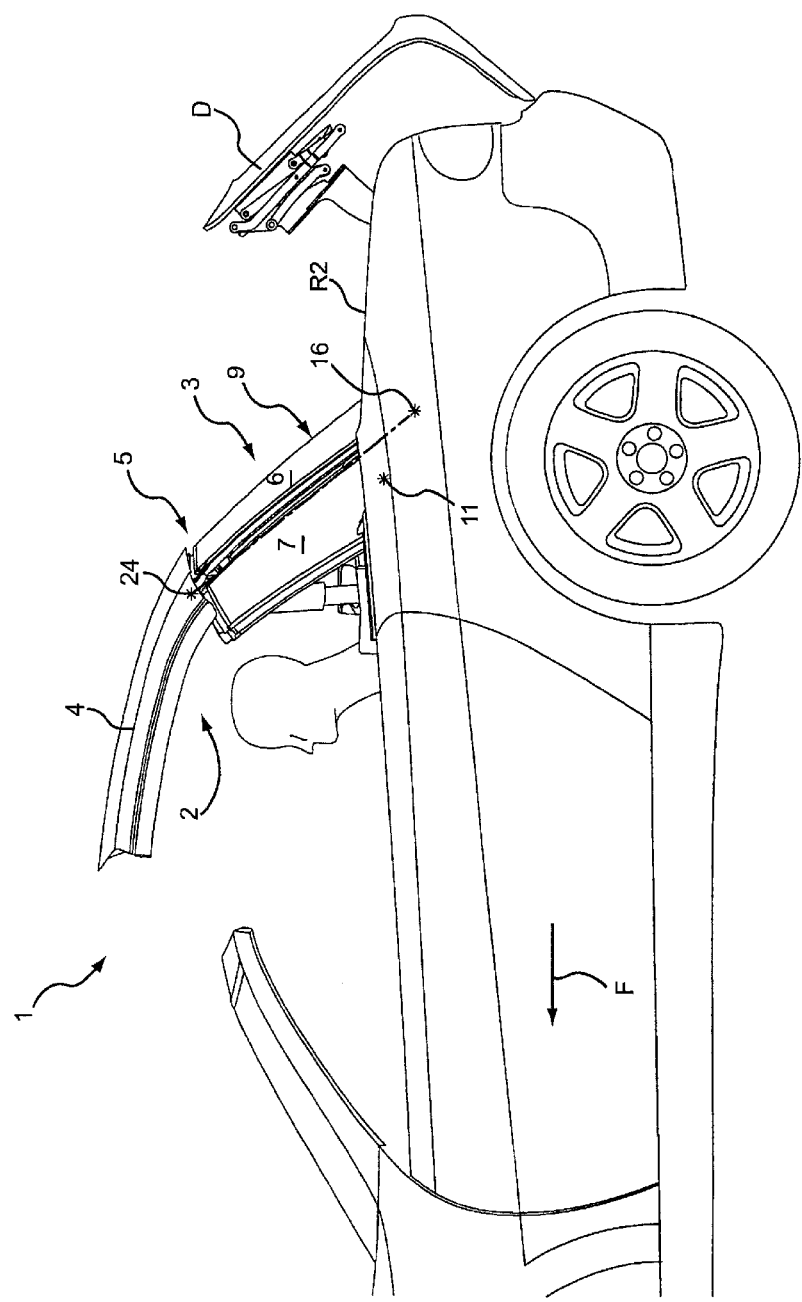
Figure 7:
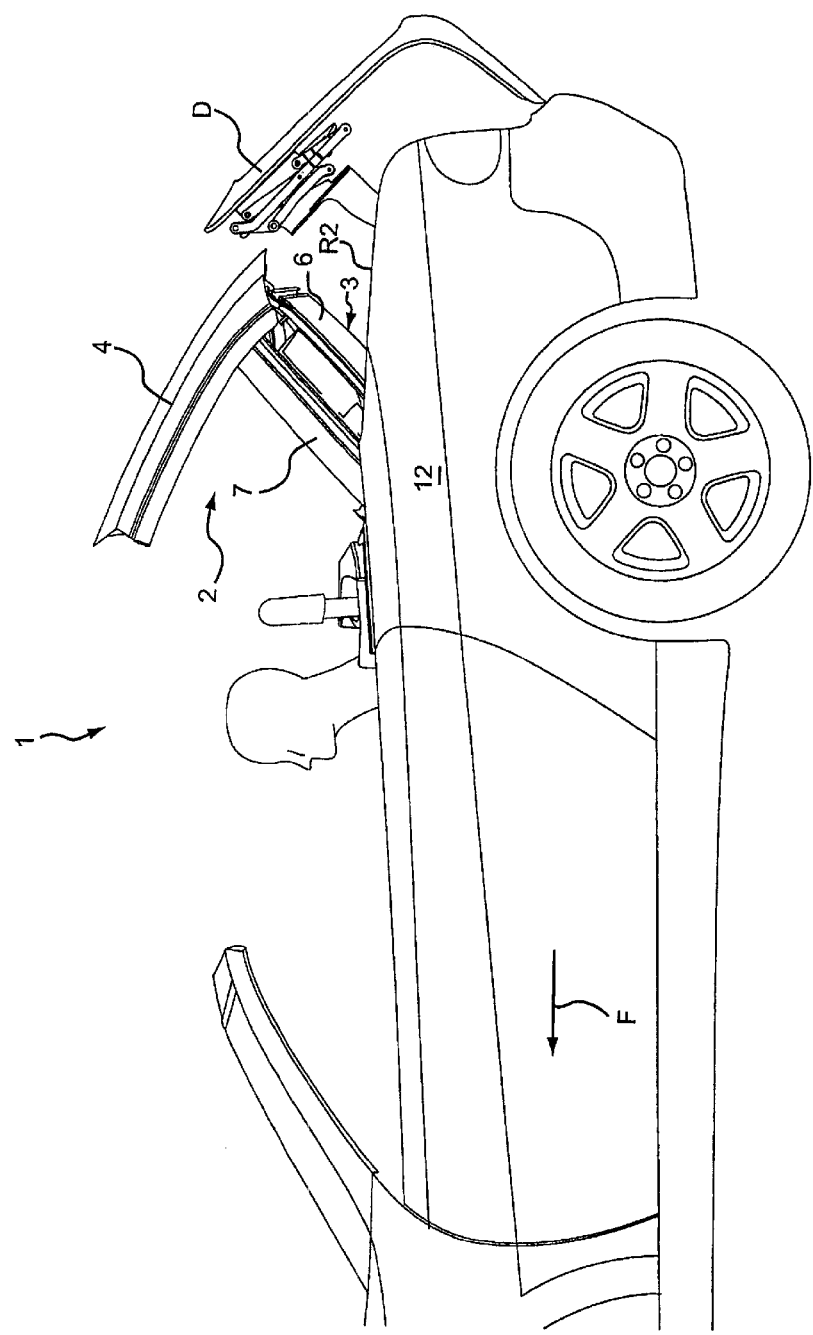
Figure 8:
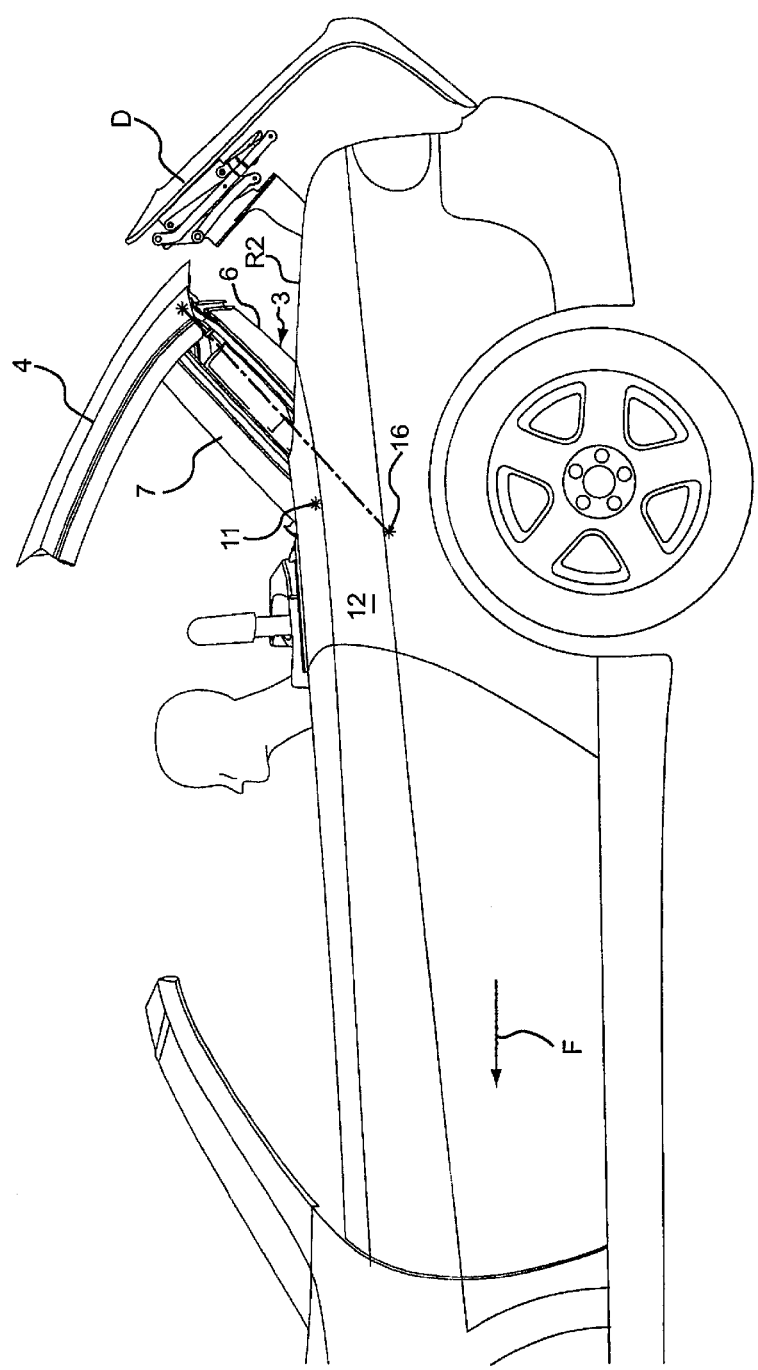
Figure 9:
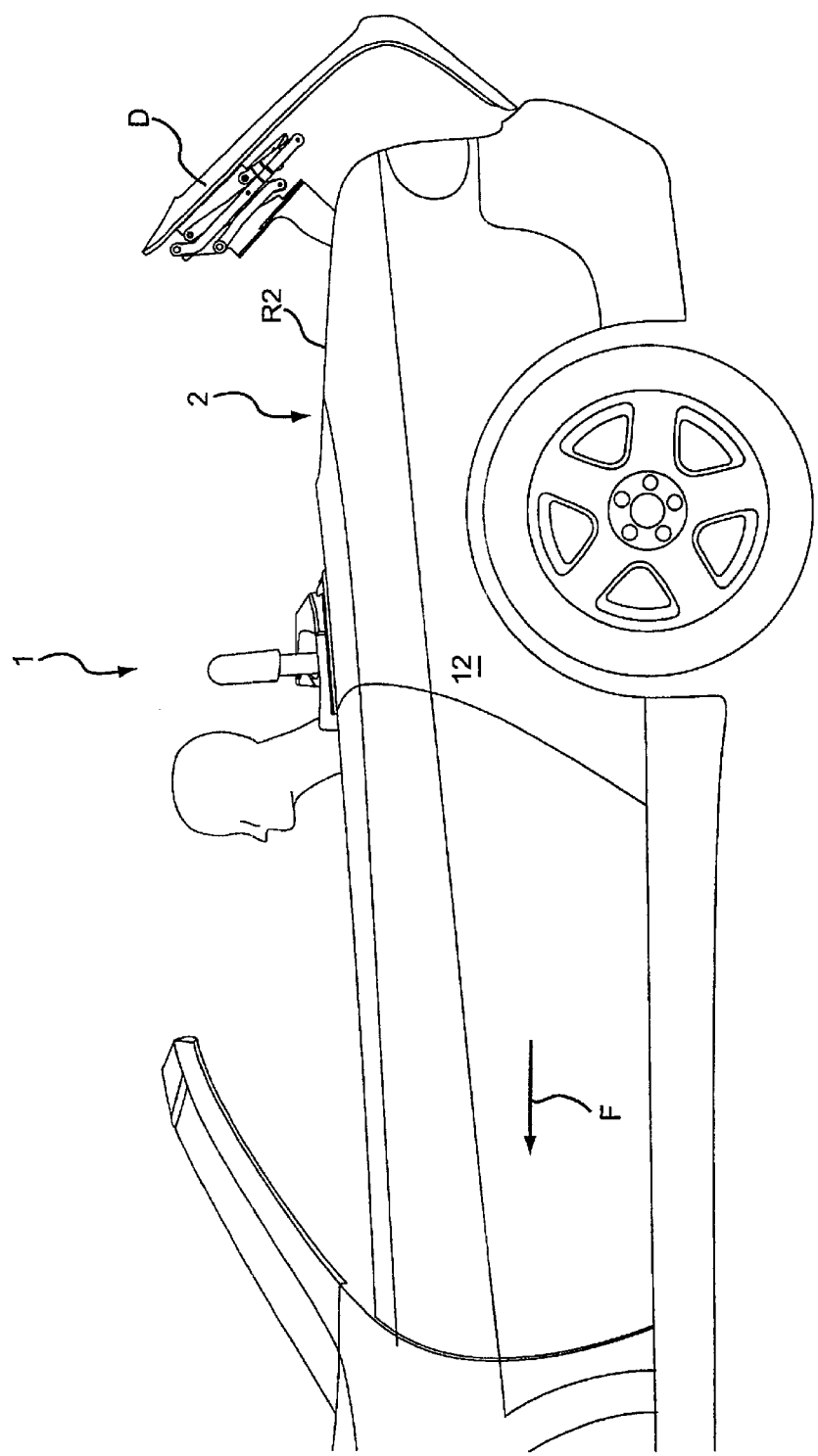
Figure 10:
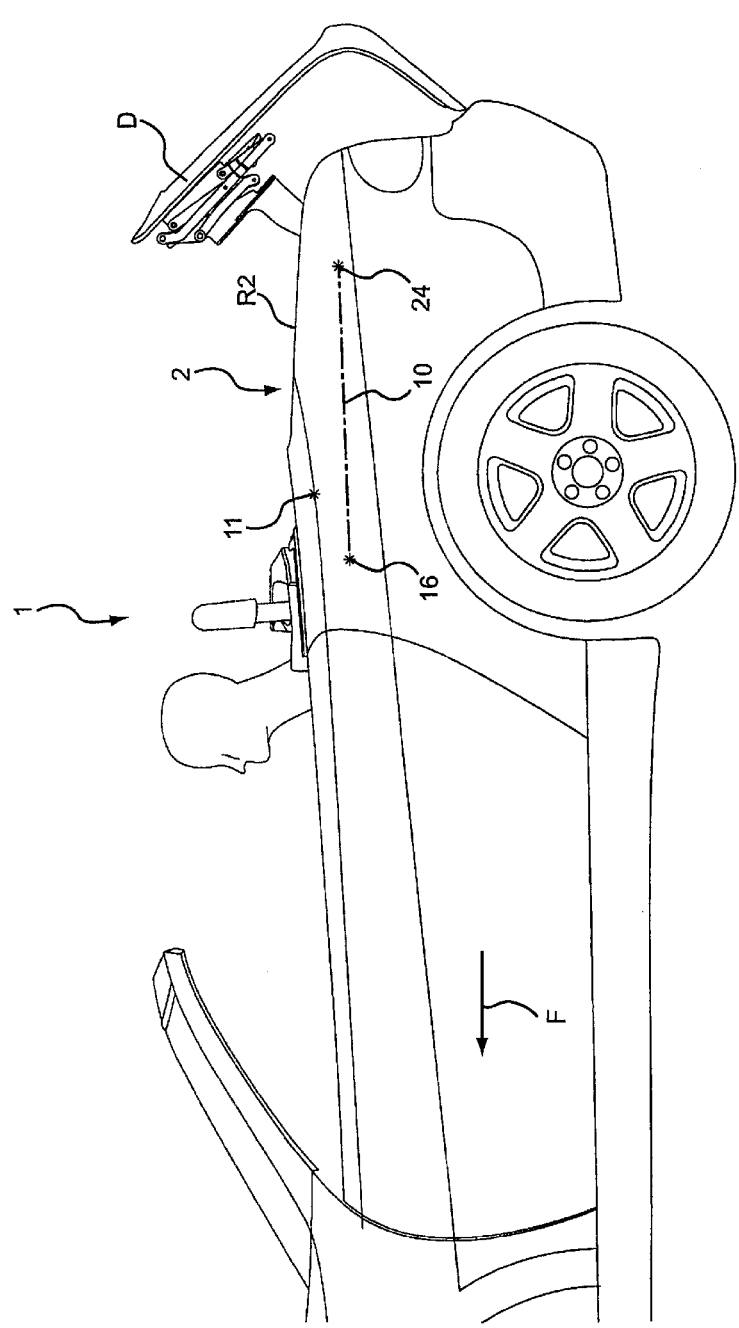
Figure 11:
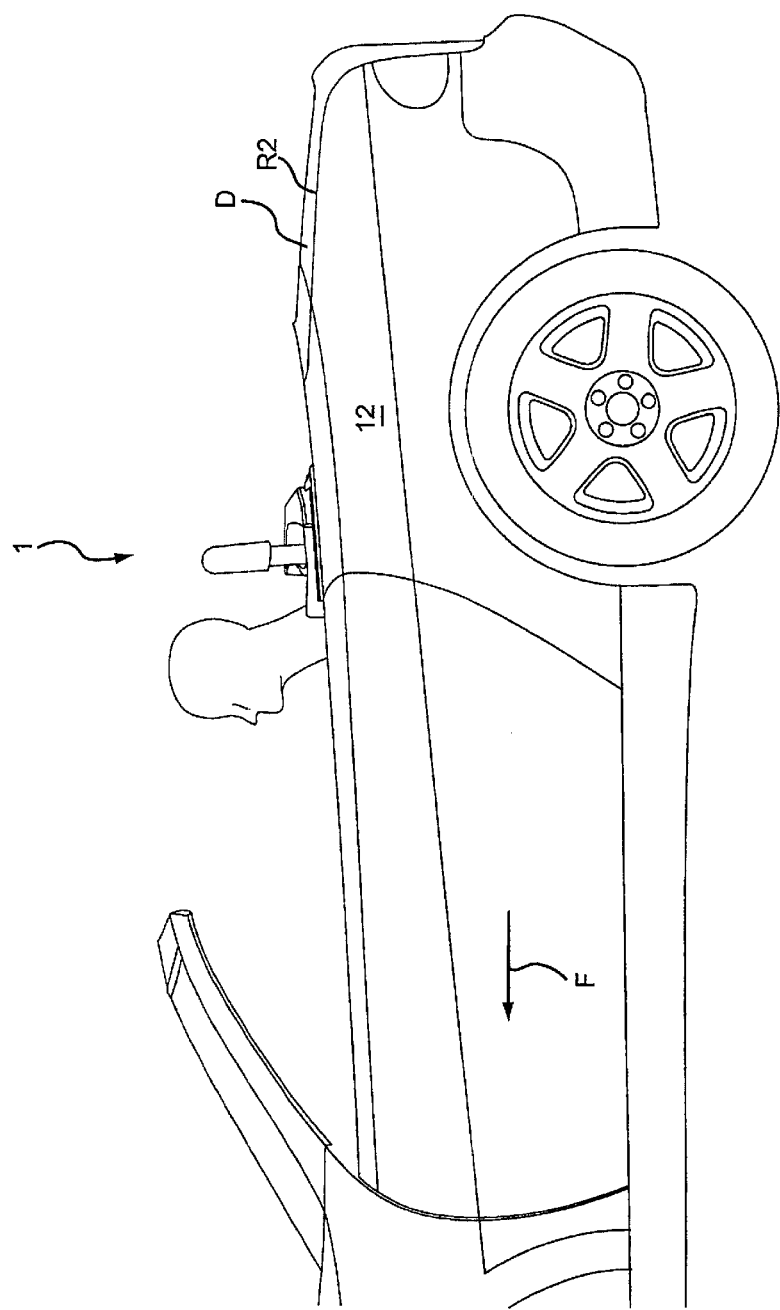
Figure 12:
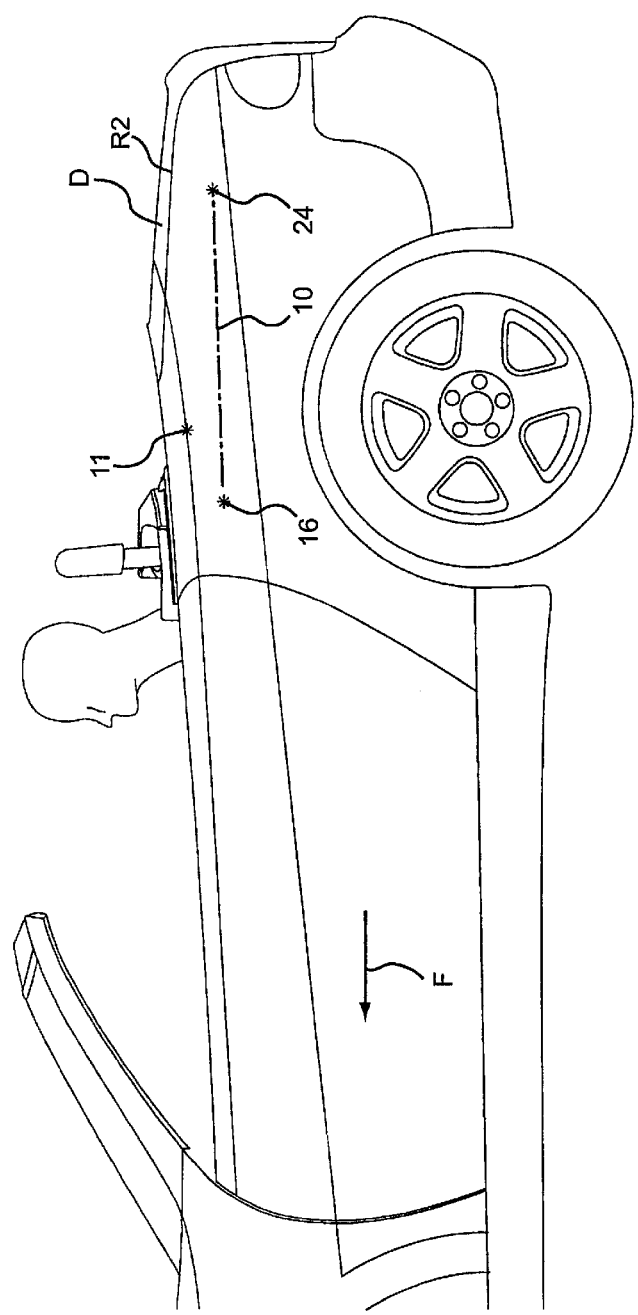

The convertible vehicle 1 of the invention comprises, in the sample embodiments shown, two roof elements 3, 4 one behind the other in the direction of travel F when the roof 2 is closed and separated from each other by at least one joint 5 lying basically transverse to the vehicle. The rear roof element 3 has a rear windshield 6 in a central segment 9 relative to the transverse direction of the vehicle and extends upwards at a slant. The rear windshield 6 can be the folding kind or, in particular, rigid and consist of plastic or glass, for example. The roof element 4 is arranged in front of the rear roof element 3 in the closed condition (FIG. 1) and lies essentially horizontal. One or more additional movable roof elements can be movably joined, say, to the front roof element 4, for example, they can be linked to it. Therefore, the convertible vehicle 1 of the invention can either be a two-seater or comprise a larger passenger compartment with two or more seat rows one behind the other.

The roof elements 3, 4 are essentially formed from rigid pieces and comprise at least rigid frames, over which a cover can be stretched.

The rear roof element 3 is divided and besides the central segment 9 it comprises at least C pillars 7 situated essentially alongside the former. These can also comprise transverse brackets or the like, which extend above or below the rear windshield 6 in the direction of a vertical longitudinal midplane 8. When opening the roof, the C pillars 7 can swivel in relative to the central segment 9 with the rear windshield 6 of the roof element 3 about pivot axes 10, which when the roof 2 is closed have one component in the direction of travel F, one transverse to the direction of travel F, and one upwardly directed component. In the sample embodiments shown here, the pivot axes 10 lie parallel to the plane of the rear roof element 3 and parallel to the side edges 6a of the rear windshield 6, which is not mandatory.

To open the roof, the rear roof element 3 can move rearwards and downwards and the front roof element 4 can swivel onto the rear roof element 3.

The movement of the rear roof element 3 occurs about a first swivel axis 11 which is horizontal and lies transversely to the vehicle 1, and which can be fixed relative to the car body 12 or it can move during the opening process. The stow-away movement can also be a superimposed motion with translatory and rotary components. In the sample embodiment, this axis 11 is fixed relative to the car body 12.

The swiveling of the front roof element 4 onto the rear roof element 3 occurs about a second, upper, horizontal swivel axis 13, which can move along with it.

The roof 2 is held movably on the car body 12 by side-mounted main bearings 14. The opening and closing movement of the rear roof element 3 can be accomplished by side-mounted drives 15 moving about two of these (in the present case). A single side-mounted or middle drive 15 can also be sufficient. In the sample embodiment, similar structural conditions exist at both sides of the vehicle, and two side-mounted drives 15 are provided.

When the roof is opened or closed, two lower three-dimensional linkage mechanisms 16 intersecting the pivot axes 10 of the C pillars and lying to the side swivel about the horizontal first swivel axis 11. In the sample embodiments, these are configured as universal joints, which is not mandatory, but it is especially simple in mechanical respects and is reliable in operation.

The lower universal joints 16 are each held by a movable forked lever 17, which is slanted relative to the universal joints 16. This can swivel about a horizontal axis 18 running transversely to the vehicle 1 and able to move on a trajectory about the first swivel axis 11 during the opening of the roof. Within the fork opening of the lever 17 is held a first arm of an x-shaped cross body, at whose center the axis 19 of this arm intersects the axis 20 of the second arm at an acute angle. The axis 18 also intersects this point. The second arm of the cross body with its pivot axis 20 is enclosed by a second forked seat 21, which is slanted to the pivot axis 10 and joined to the latter. Since the pivot axis 10 also intersects the point of intersection of the axes 18, 19, 20, the three-dimensional link mechanism 16 is therefore configured as a spherical link mechanism.

A swiveling of the rear roof element 3 about the axis 11 thus necessarily produces a turning of the axis 10, without this requiring a special drive unit. The C pillars 7 are suspended from the axes 10 by brackets 22 extending out laterally from the pivot axes 10, so that they are turned along with the axis 10.

In the first sample embodiment, the pivot axes 10 are configured in the lower region as a stub axis and only extend from the universal joints 16 to the brackets 22. These transmit the rotary motion on to the C pillars 7, situated further outward, and by means of upper brackets 23 again inwards to the upper universal joints 24, which as the upper three-dimensional link mechanism translate the rotary motion of the C pillars 7 about the axes 10 into the swiveling together of the roof elements 3, 4 about the upper swivel axis 13. Because the axes 10 of the C pillars 7 in the upper and lower region are joined to the C pillars, lying further on the outside, by means of brackets 22, 23, through which the pivot axes run, the C pillars can run more on the outside with their edges facing the center of the vehicle for a middle portion of their dimension relative to the vertical. Thus, the outer edges 6a of the rear windshield 6 can lie at the side outside the pivot axes 10, without being covered by the latter. This optimizes the view to the rear.

Therefore, on the whole, the rear roof element 3 can swivel, when changing position, about a first axis 11 lying transverse to the vehicle, the front roof element 4 can swivel relative to the rear roof element 3 about a second axis 13 lying parallel to the latter, and the pivot axes 10 of the C pillars 7 link the movements about both swivel axes 11, 13.

The universal joints 24 in the upper region of the pivot axes 10 likewise translate with no additional drive units the rotary motion of the C pillars 7 about the axes 10 into the swivel movement of the front roof element 4 with respect to the rear roof element 3 about the second swivel axis 13, lying horizontal and transverse to the vehicle.

For this, the universal joints 24 each enclose a forked seat 25, slanting to the axis 10, into which the pivot axes 10 emerge. This is connected via a first auxiliary axis 26 to a second forked seat 27, which is linked to the front roof element 4 and can swivel about a second auxiliary axis 28. Thanks to the torque about the axes 10 introduced via the brackets 23 of the C pillars 7, the forked seat 25 is swiveled in the direction of the arrow 29 when the roof opens and thus pulls the oppositely situated forked seat 27 downward in the direction of the rear roof element 3, so that the front roof element 4 is forced to swivel about the axis 13, which intersects the two auxiliary axes 26, 28 and the pivot axes 10. The upper link mechanism 24 is therefore also a spherical link mechanism, in which all axes 10, 26, 28, 13 intersect at one point.

Thus, a single drive 15 is sufficient overall for the movement of the rear roof element 3 about the first swivel axis 11 lying transverse to the vehicle 1, the front roof element 4 about the second horizontal swivel axis 13, and for the rotary motion of the C pillars 7 about the axes 10, and this can directly drive the movement of the rear roof element 3 about the first axis 11.

In the first sample embodiment, the pivot axes 10 of the C pillars 7 are grasped for at least part of their region by drive shafts, so that the swiveling of the front roof element 4 can be mediated by the rotary movement of the C pillars 7, for which it can be translated into a swivel movement between the roof elements 3, 4 in the region of the joint 5 between them.

Figure 30:
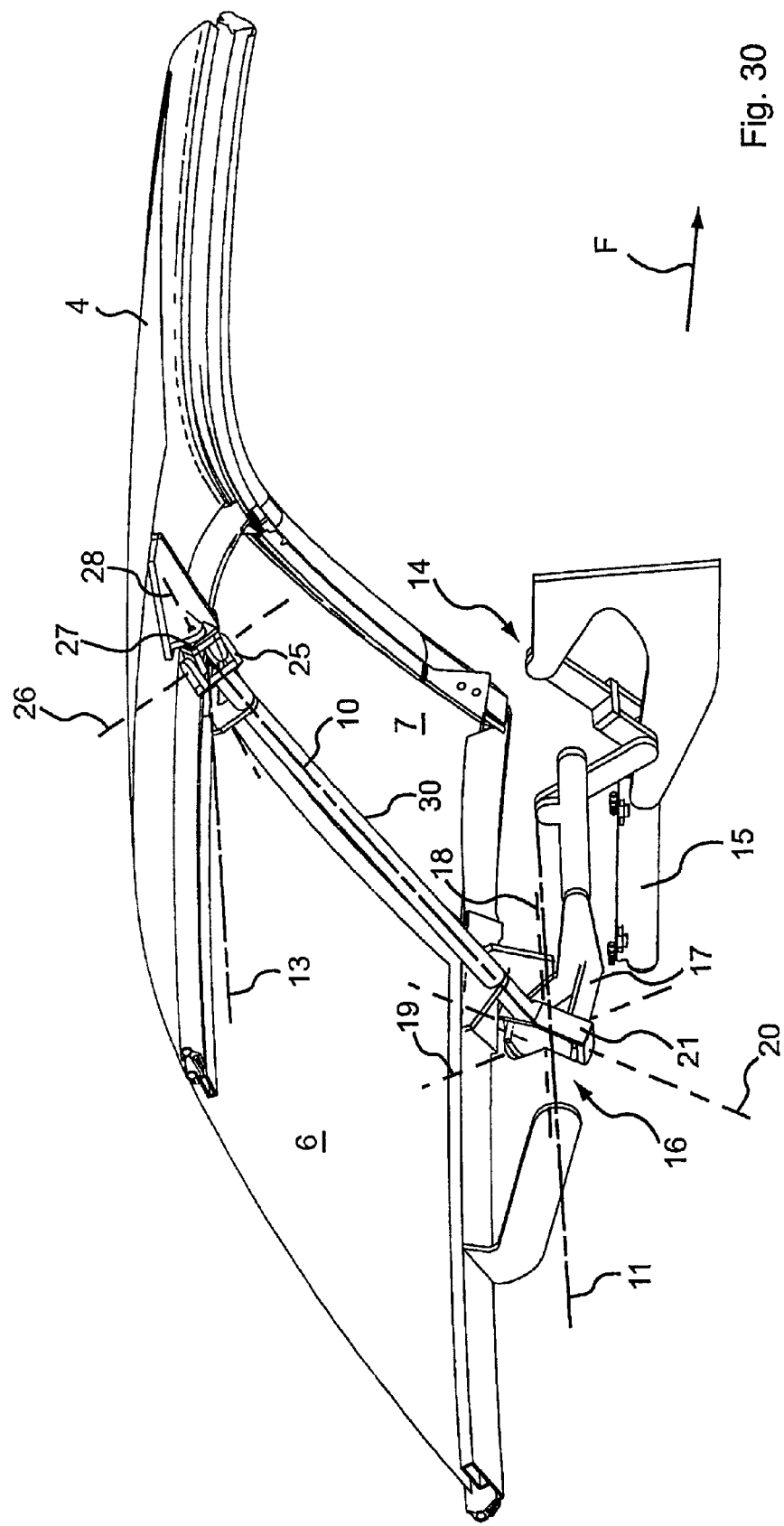
FIG. 30 is a view similar to FIG. 22, but with a continuous torsion bar connecting the upper and lower three-dimensional link mechanisms.

As an alternative, as is shown in the second sample embodiment per FIG. 30, a continuous torsion bar 30 can also be arranged on each side of the vehicle, from which the C pillars are suspended. The C pillars themselves then play no force-relaying function to apply a torque to the upper roof element, but rather the force relaying is accomplished solely by means of the continuous torsion bars 30.

In both sample embodiments, during the opening of the roof the C pillars 7 are swiveled about the axes 10 with respect to the middle segment 9 so that in the position when the roof has been opened they lie between the roof elements 3, 4 and are curved in the same direction relative to the front roof element 4. Since in any case the roof elements 3, 4 in the stowed-away condition lie curved oppositely toward each other, the empty space lying between them can be utilized very economically for the swiveling-in C pillars 7, without further loss of room.

The entire movable roof 2 can be tested for its function before being installed in the car being built; the ready installed modular unit can then be delivered to the car being built and connected to it merely by side-mounted main bearings 14.

The invention can be used both in vehicles with manually moved roofs and also especially in fully or partly automatic moving roofs 2.

Figure 13:
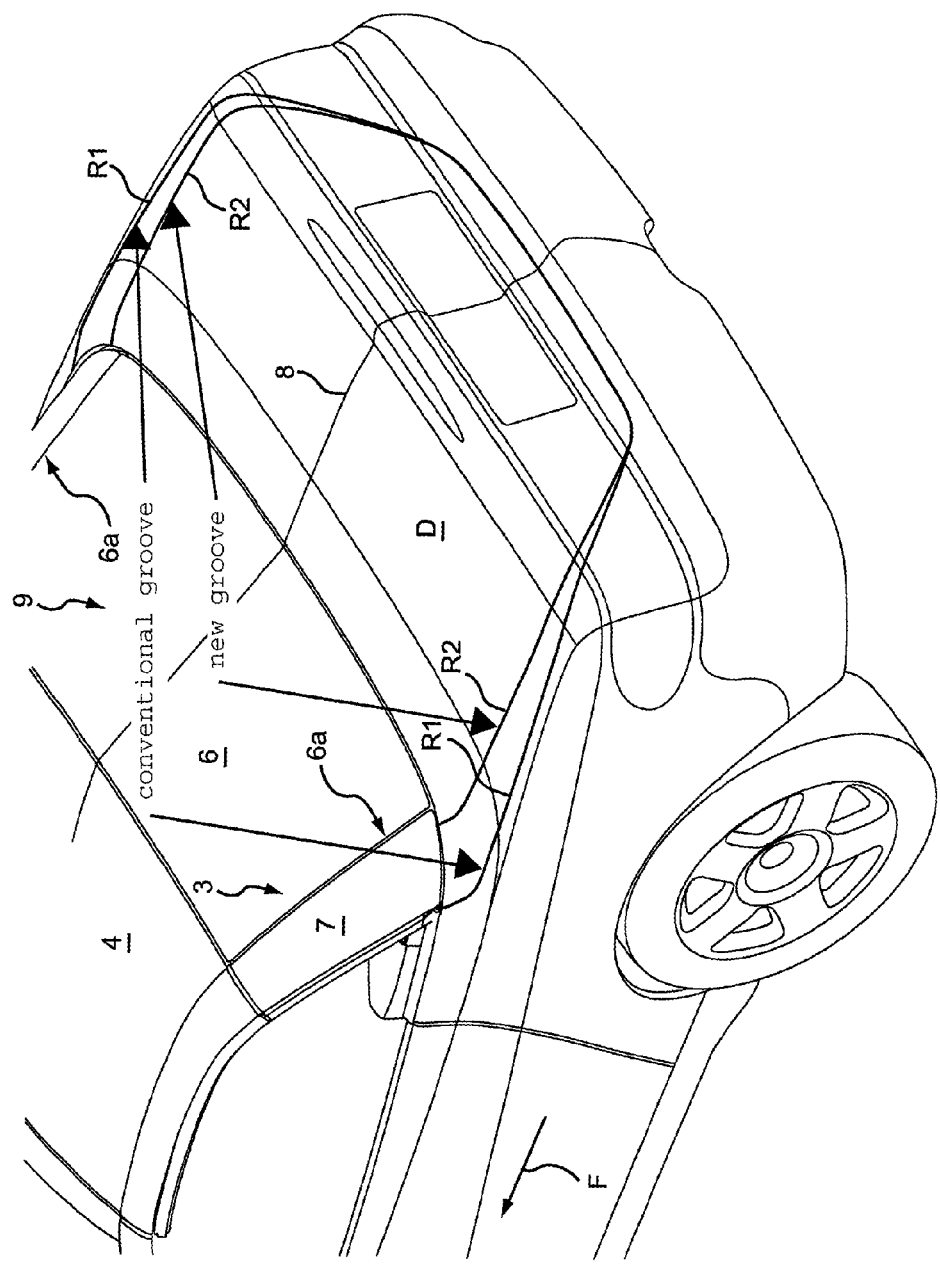
FIG. 13 is a perspective view of the vehicle's rear with conventional edge joint, and also showing the edge joint of the rear cover of the invented vehicle, FIG. 14 to FIG. 21, the phases of the roof opening in perspective view of the left half of the roof, drawn by itself, looking in the direction of travel, where
Figure 14:
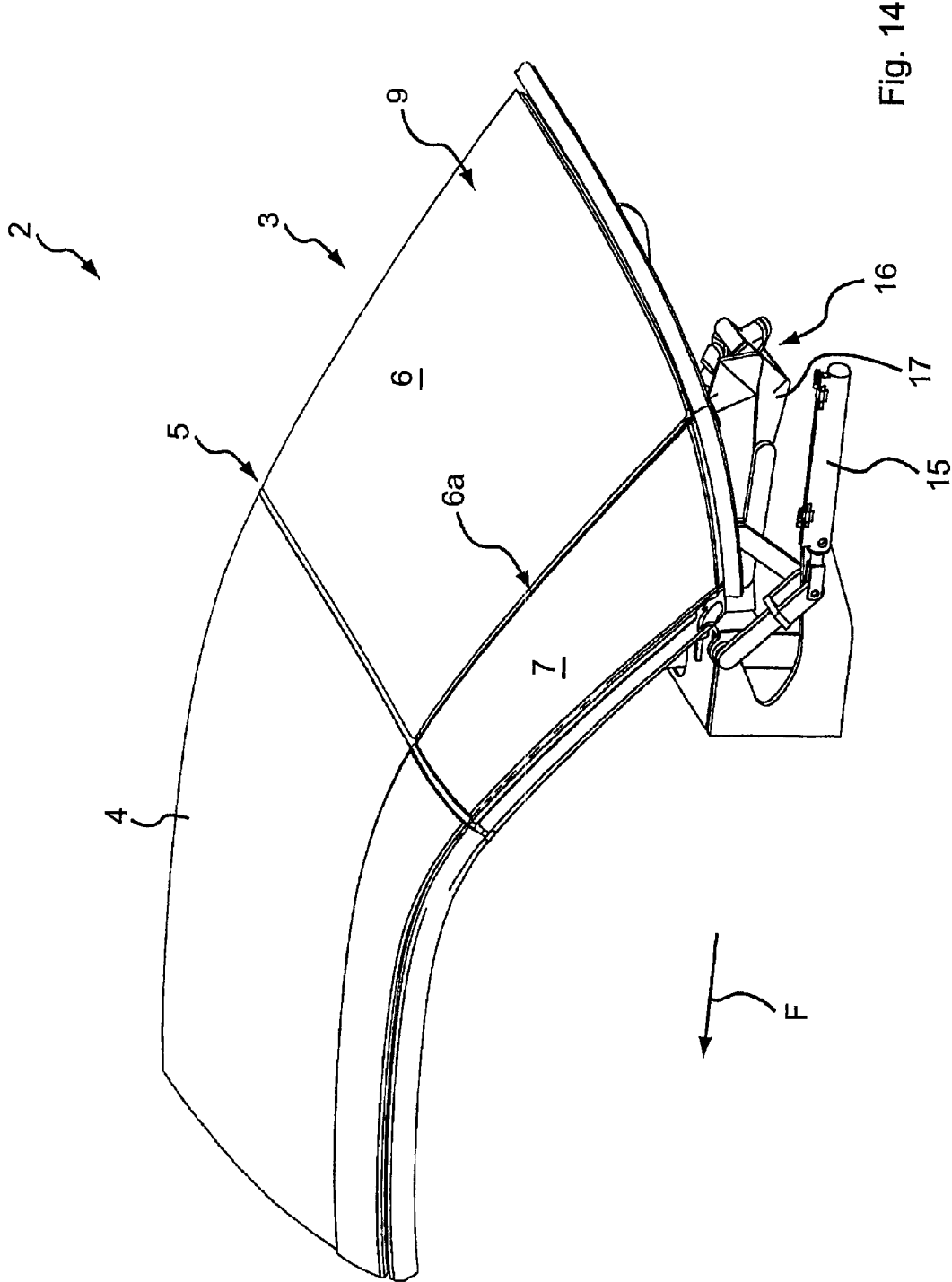
FIG. 14 is a view of the closed roof.
Figure 15:
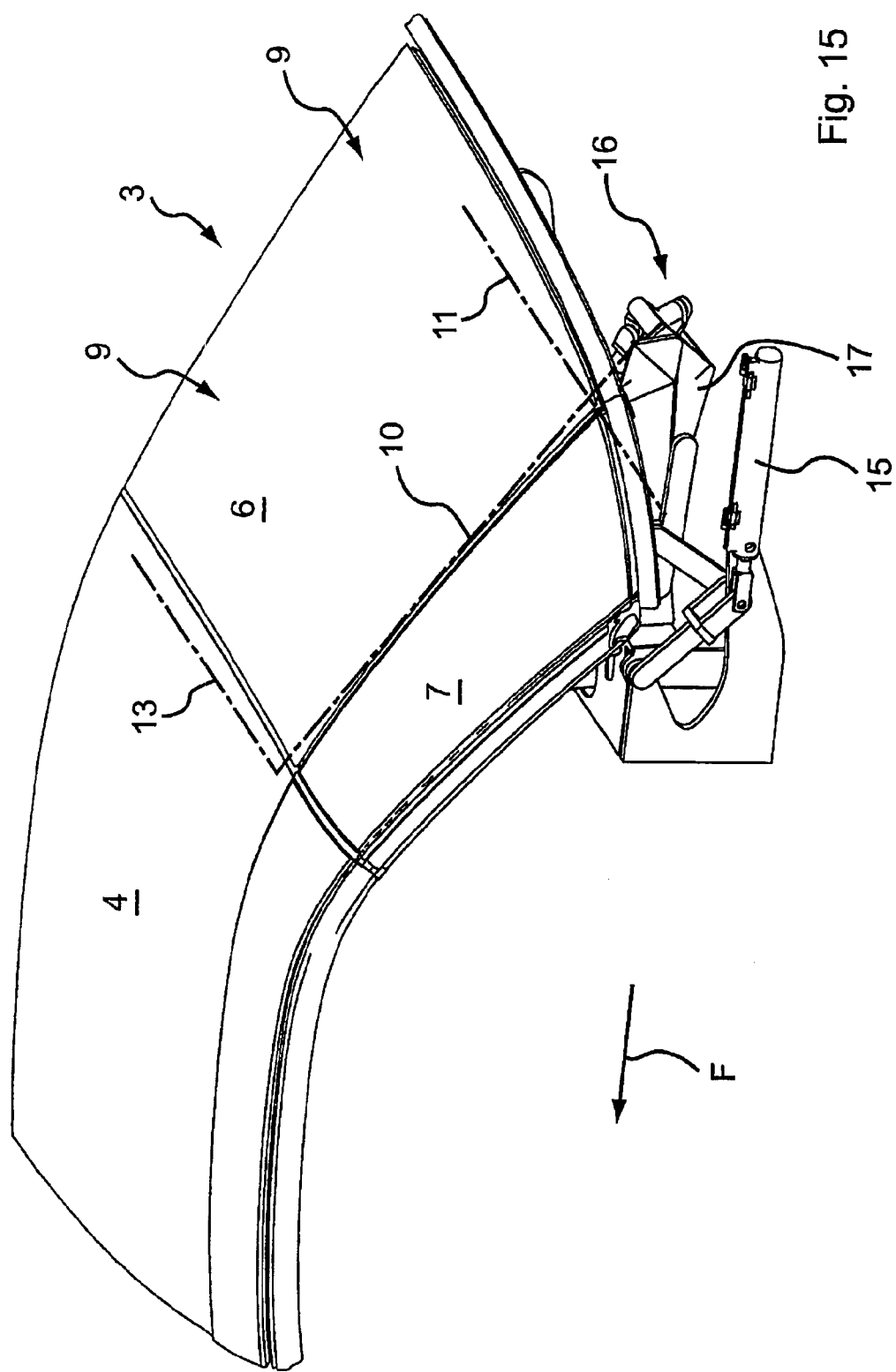
FIG. 15 is a view similar to FIG. 14, also showing the pivot axis of the C pillar and swivel axes of the rear roof element relative to the car body and of the roof elements relative to each other.
Figure 16:
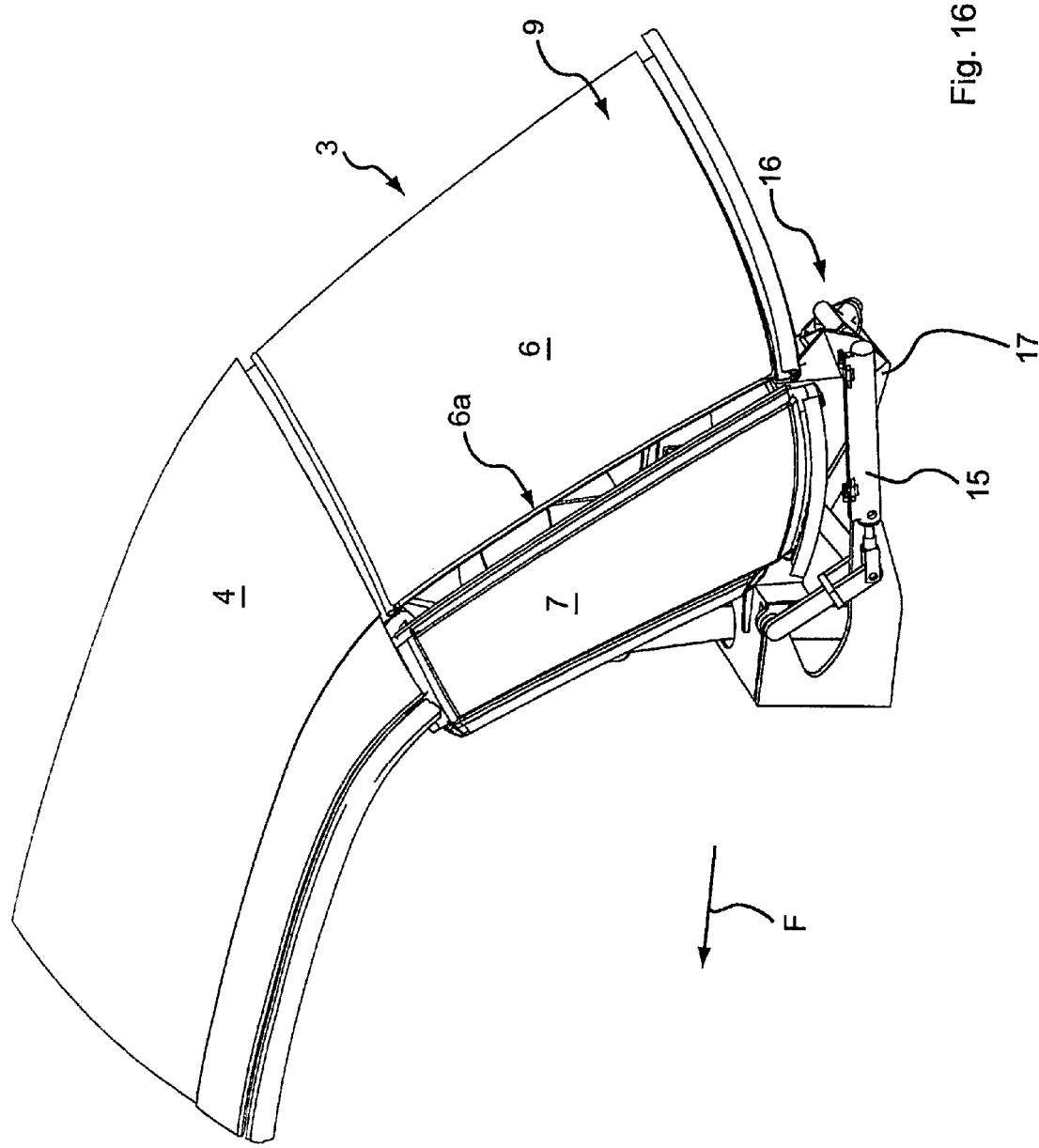
FIG. 16 is a view of the roof during its initial opening, somewhat corresponding to the position per FIG. 7.
Figure 17:
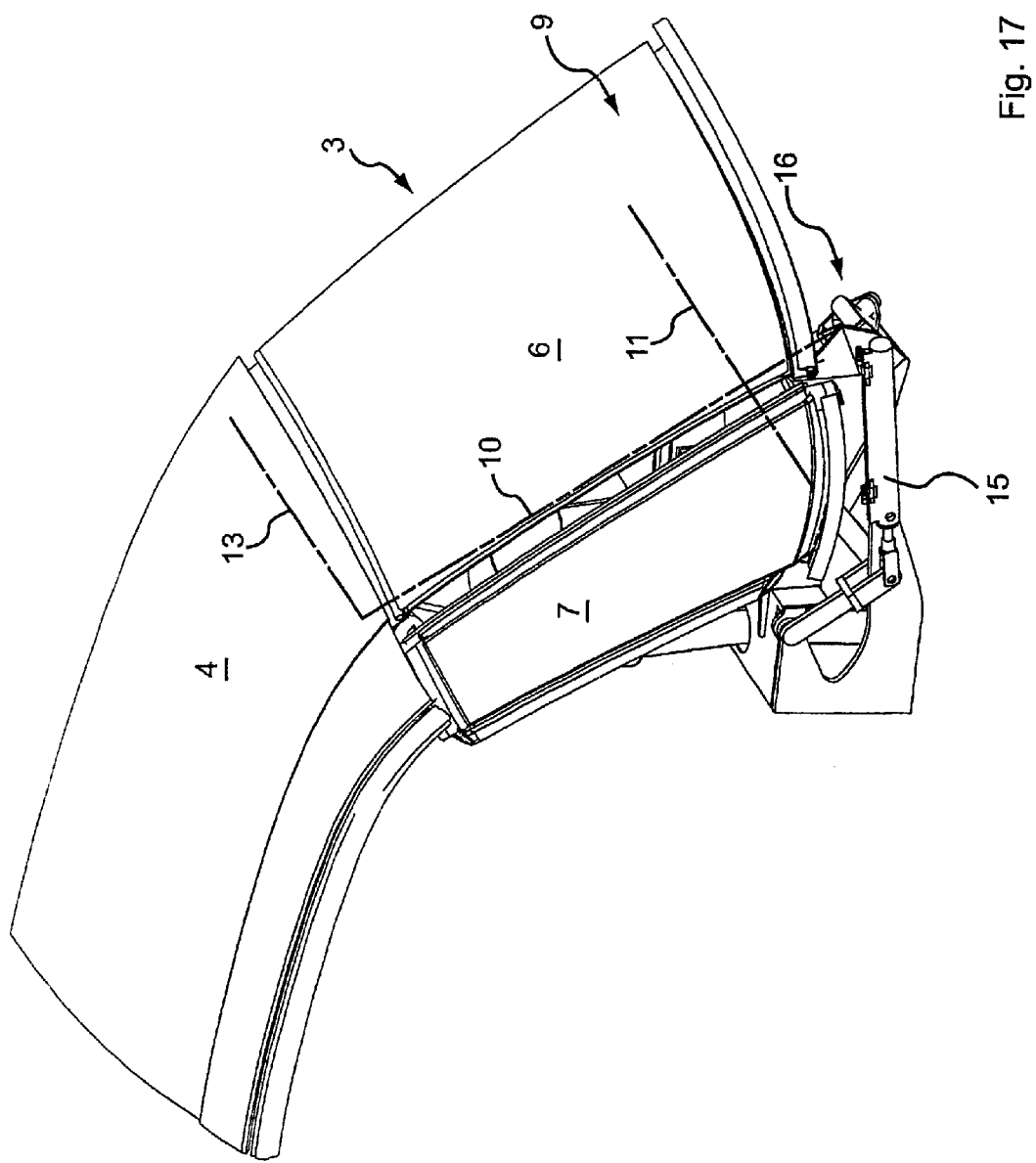
FIG. 17 is a view similar to FIG. 16, also showing the pivot axis of the C pillar and swivel axes of the rear roof element relative to the car body and of the roof elements relative to each other.
Figure 18:
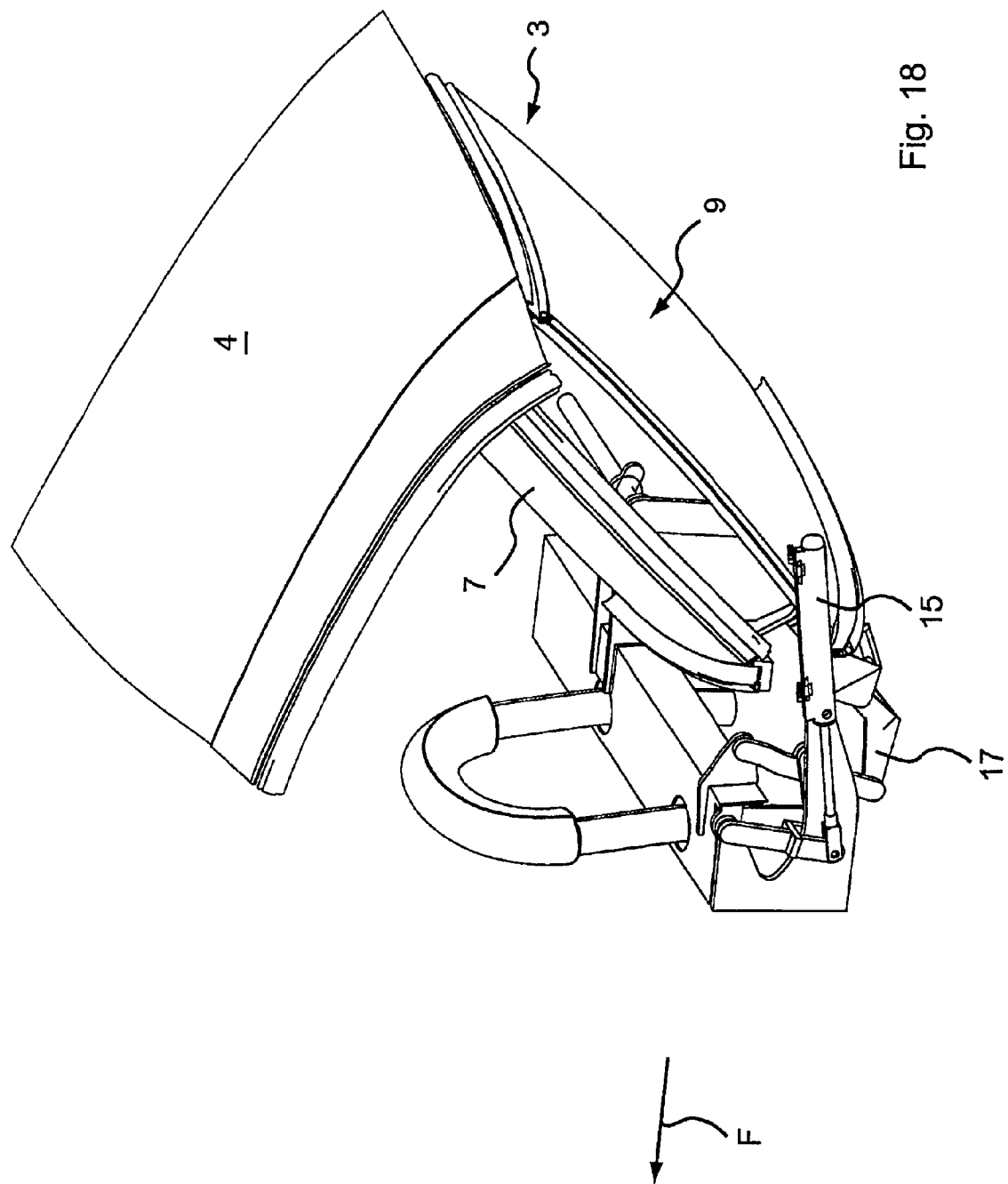
FIG. 18 is a view of the roof during its further opening, somewhat corresponding to the position per FIG. 9.
Figure 19:
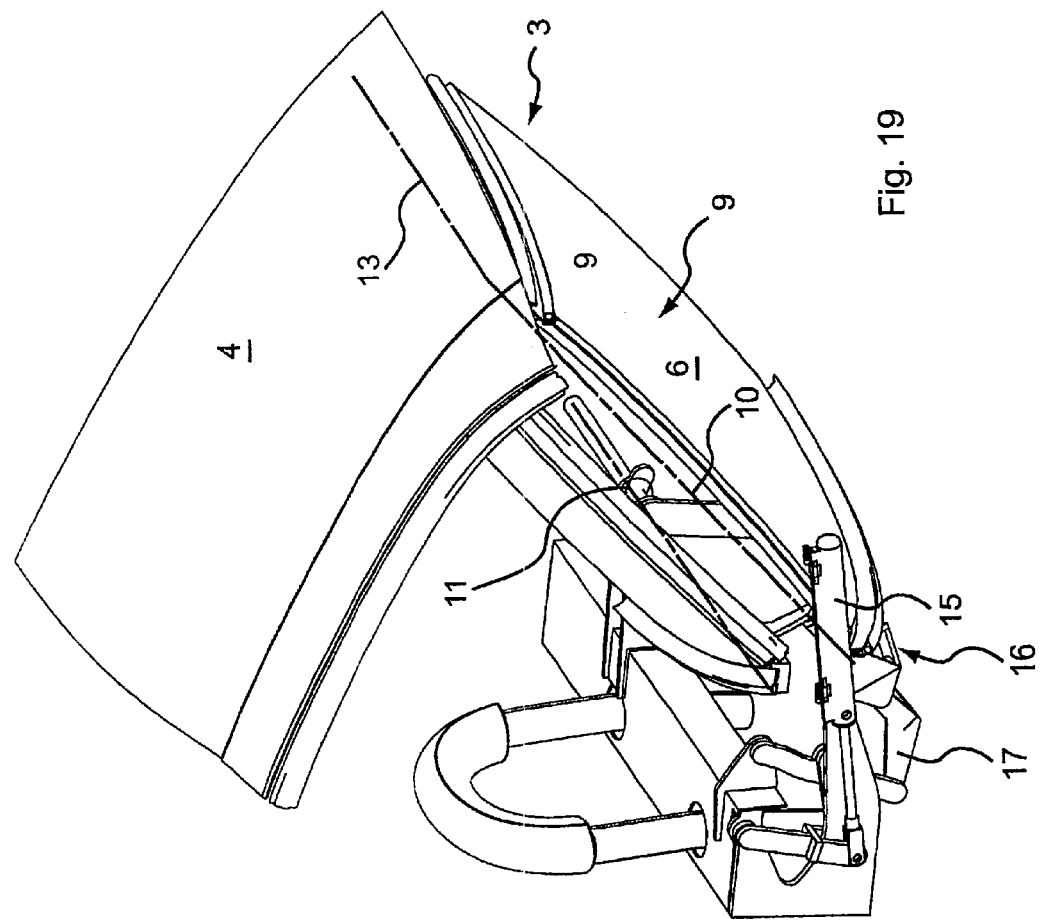
FIG. 19 is a view similar to FIG. 18, also showing the pivot axis of the C pillar and swivel axes of the rear roof element relative to the car body and of the roof elements relative to each other.
Figure 20:
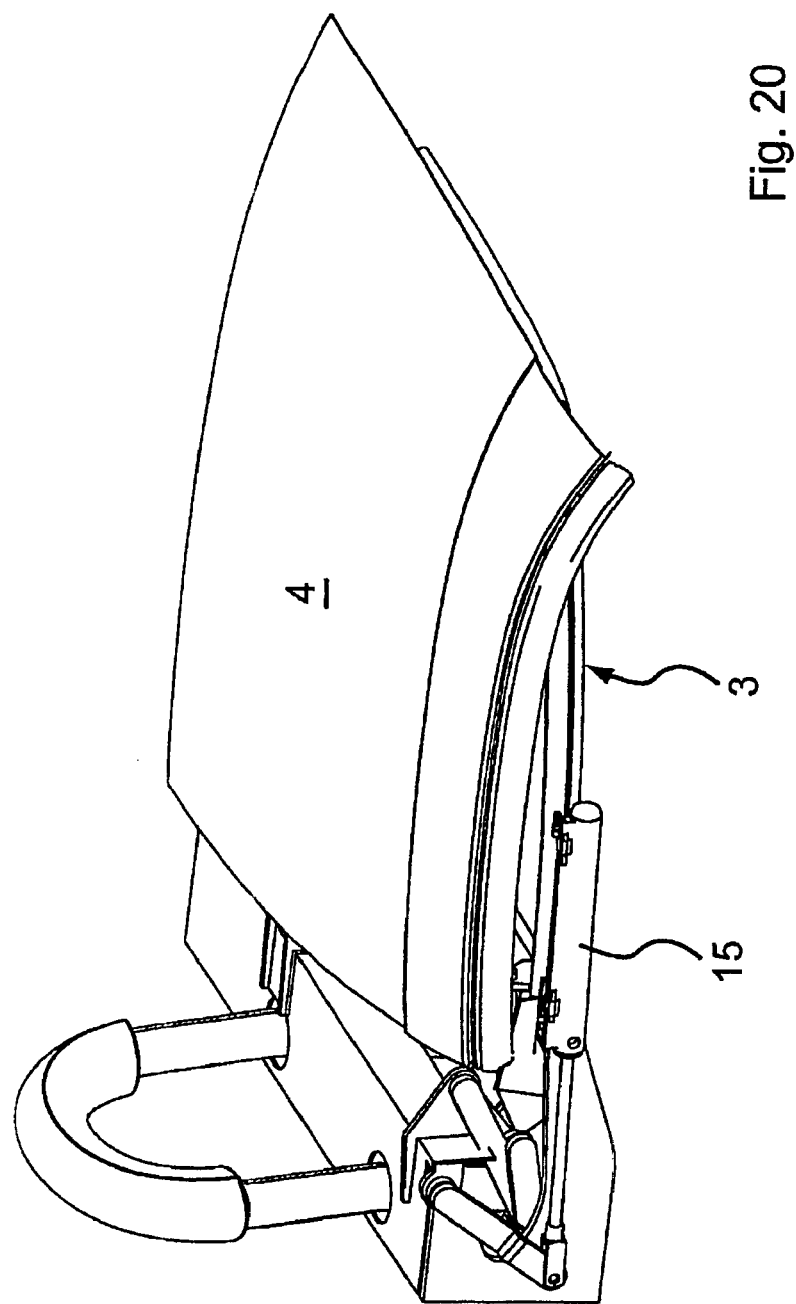
FIG. 20 is a view of the opened roof.
Figure 21:
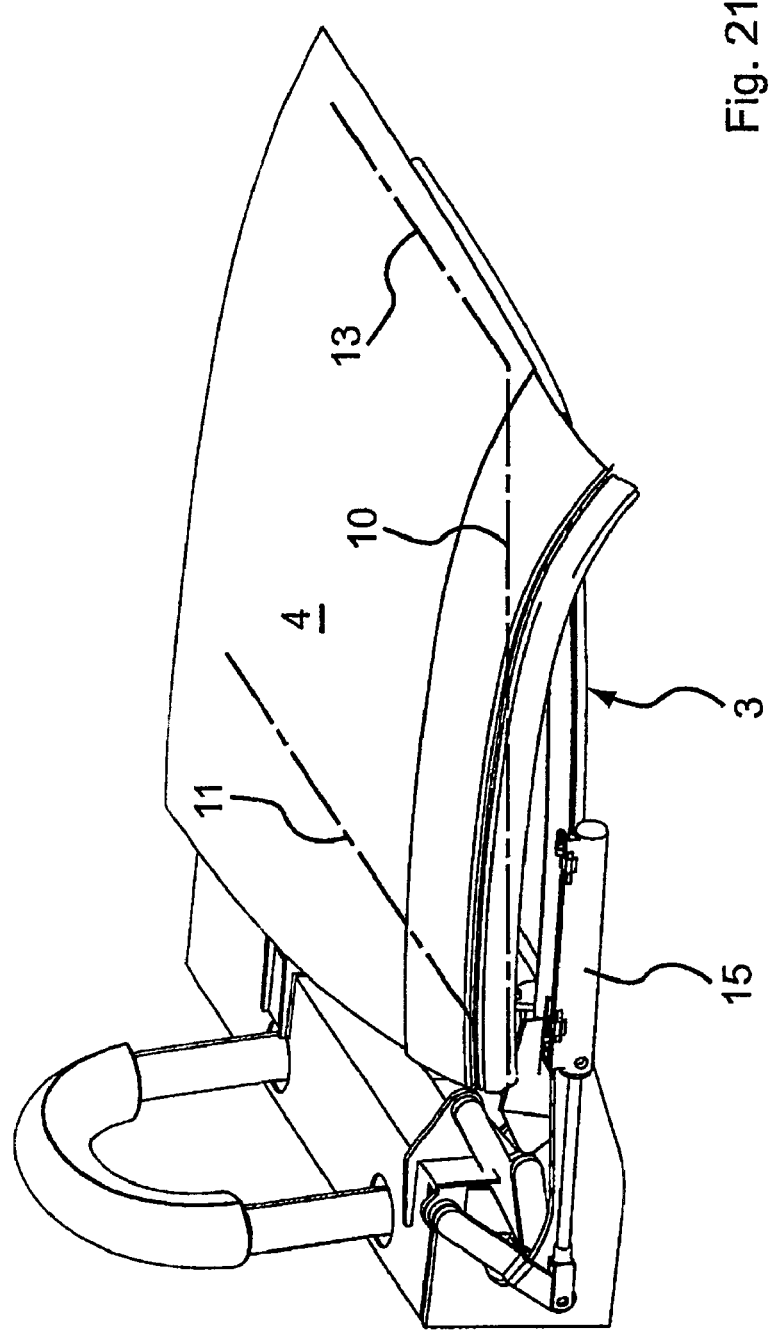
FIG. 21 is a view similar to FIG. 20, also showing the pivot axis of the C pillar and swivel axes of the rear roof element relative to the car body and of the roof elements relative to each other, FIG. 22 to FIG. 29, the phases of the roof opening in perspective view from the direction of the passenger cabin, looking at the left rear half in the direction of travel, drawn separately, where
Figure 22:
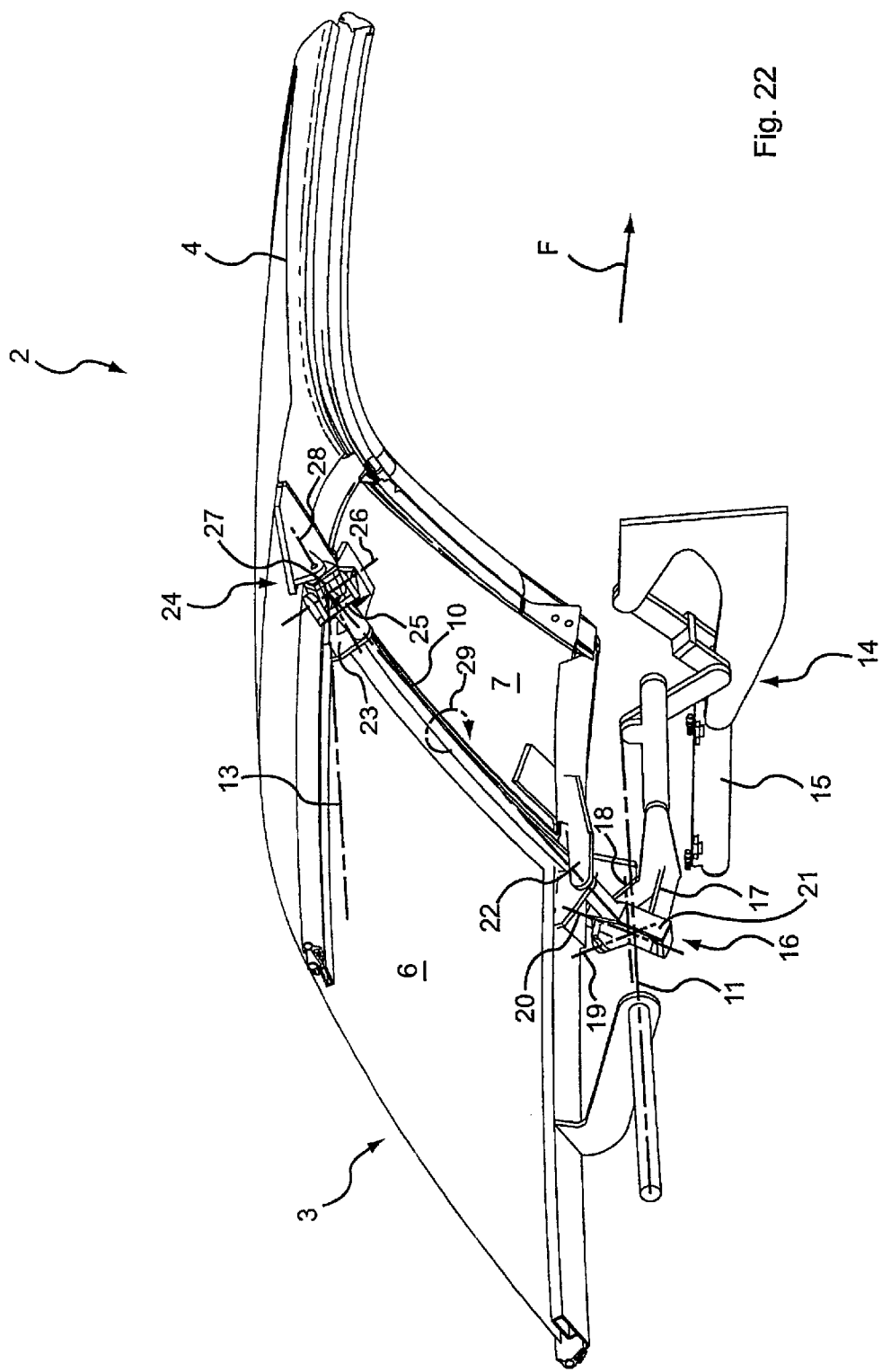
FIG. 22 is the closed roof, also showing the pivot axis of the C pillar and swivel axes of the rear roof element relative to the car body and of the roof elements relative to each other.
Figure 23A:
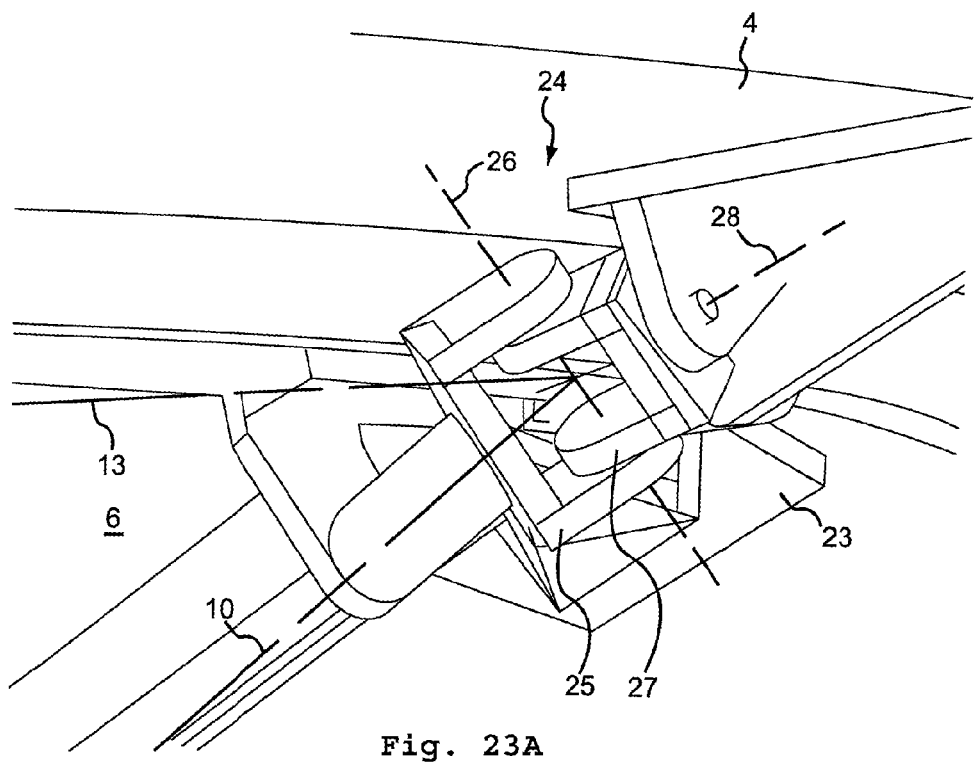
FIG. 23A and FIG. 23B are detail views of the upper and lower three-dimensional link mechanism in this position.
Figure 23B:
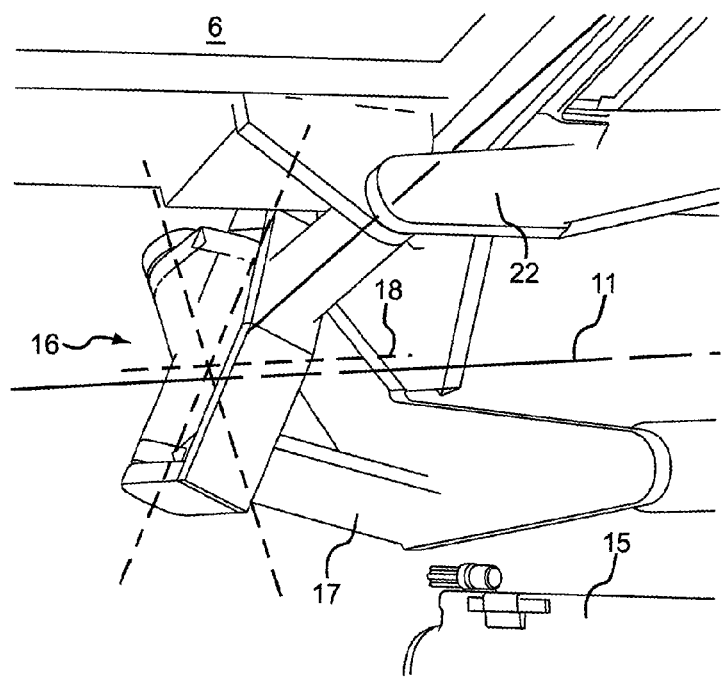
Figure 24:
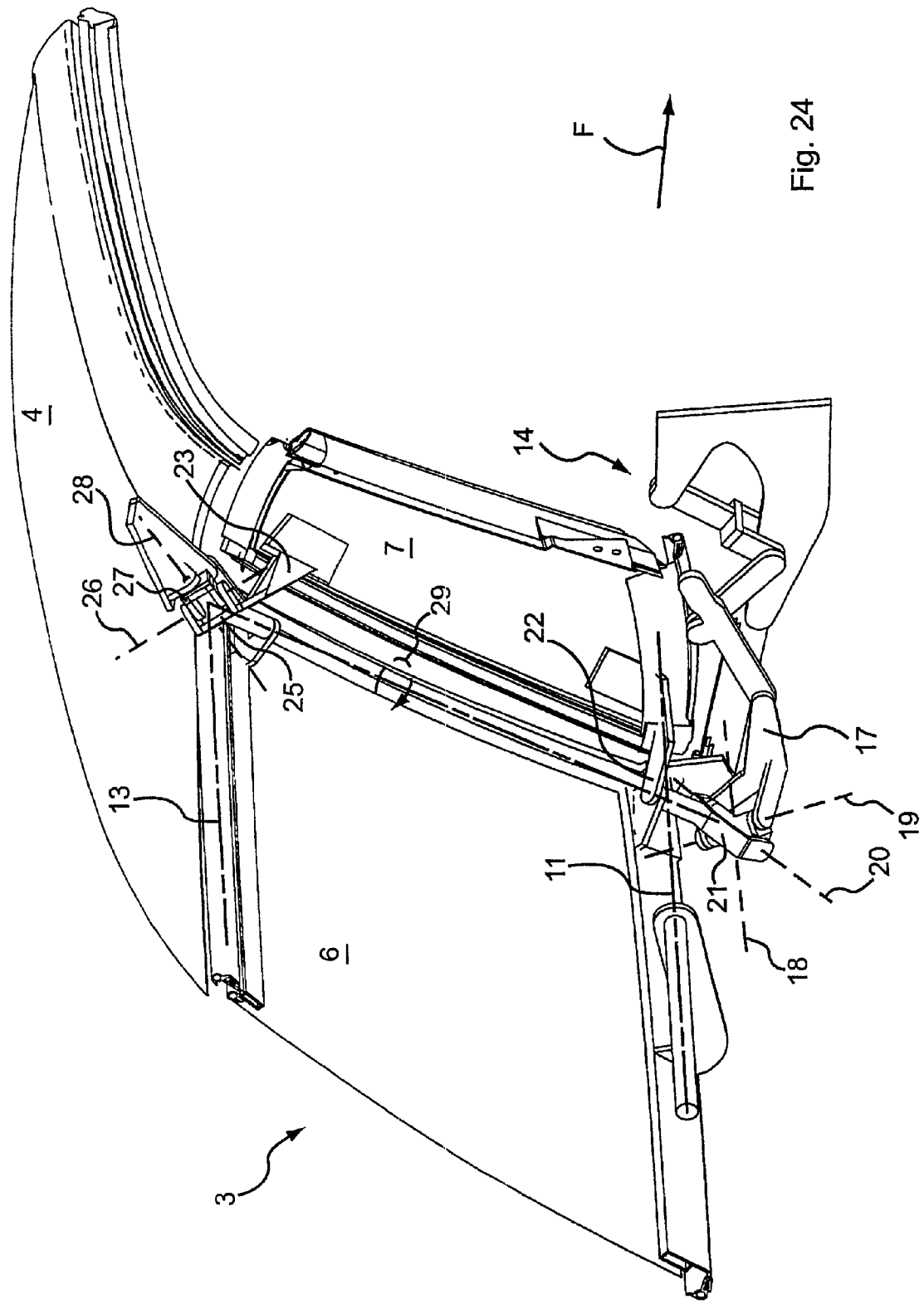
FIG. 24 is the roof, also showing the pivot axis of the C pillar and swivel axes of the rear roof element relative to the car body and of the roof elements relative to each other, during its initial opening, somewhat corresponding to the position per
Figure 25A:
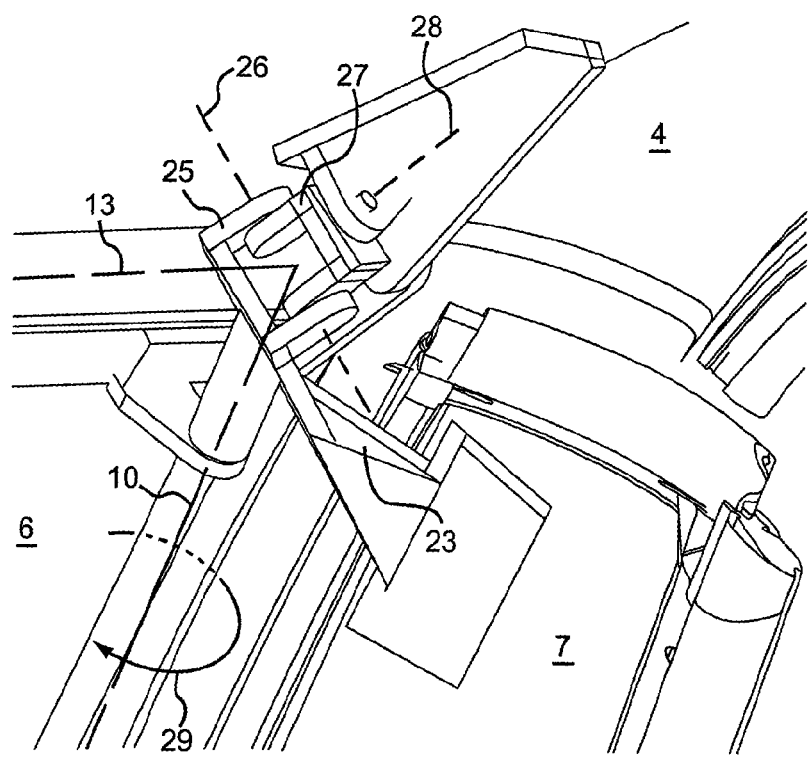
Figure 25B:
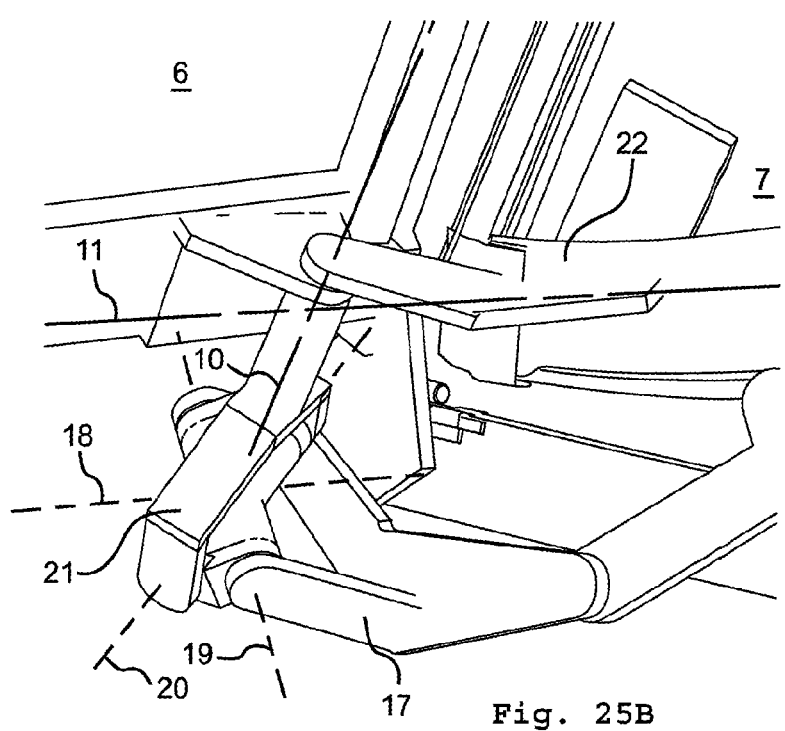
Figure 26:
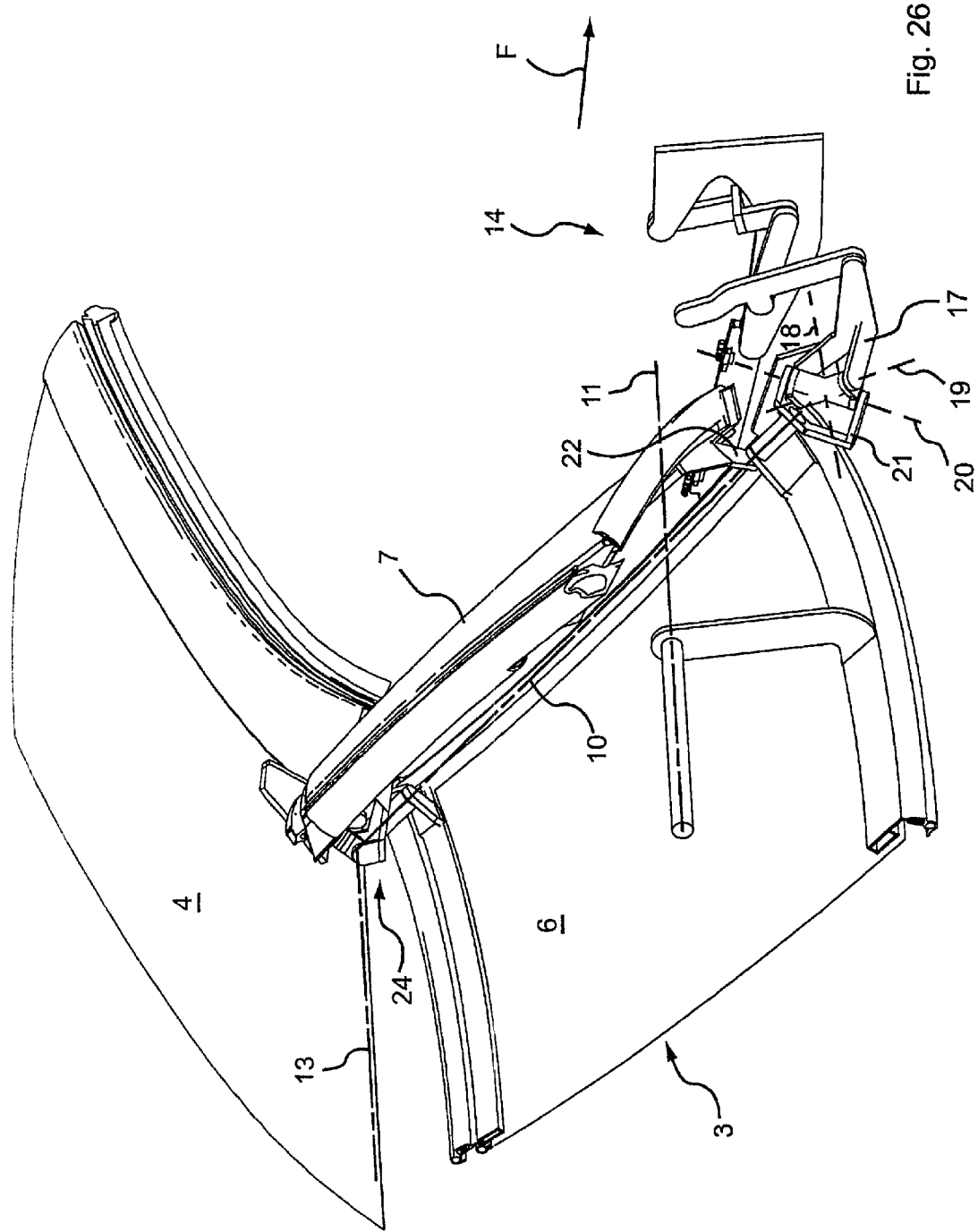
FIG. 26 is the roof, also showing the pivot axis of the C pillar and swivel axes of the rear roof element relative to the car body and of the roof elements relative to each other, during its initial opening, somewhat corresponding to the position per
Figure 27A:
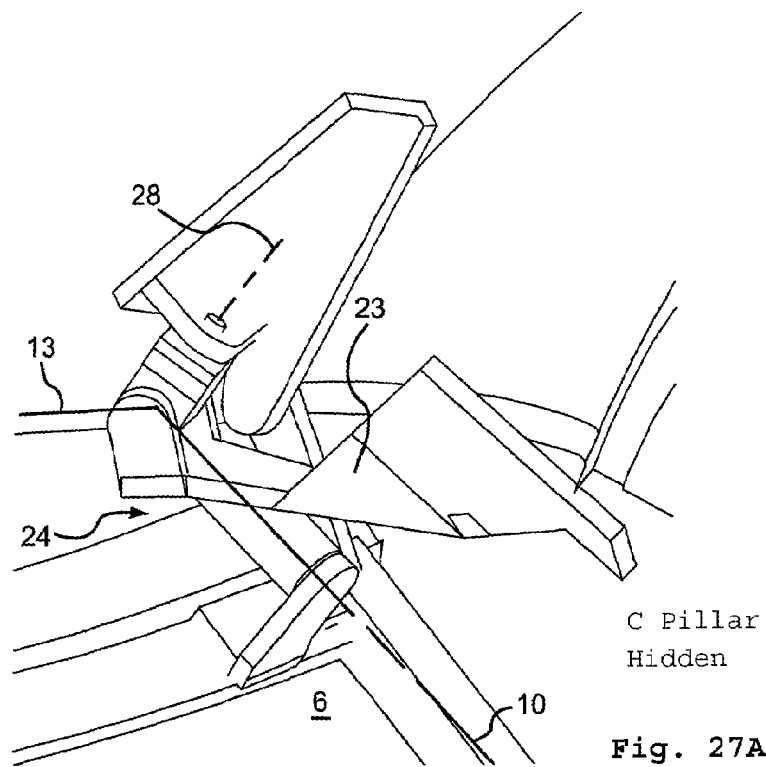
Figure 27B:
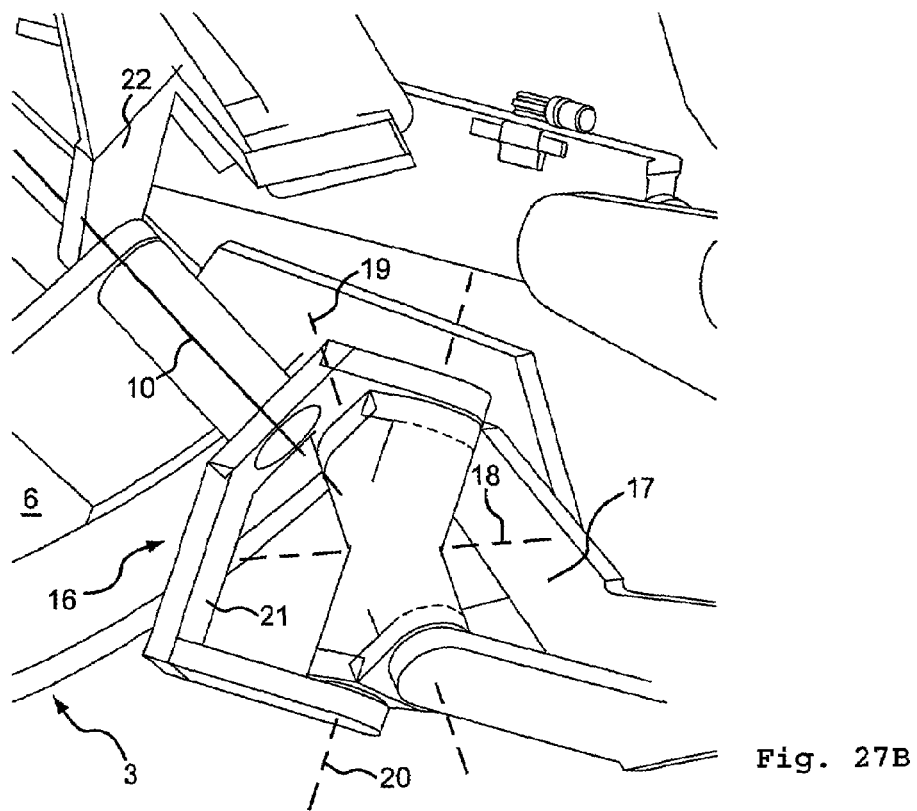
Figure 28:
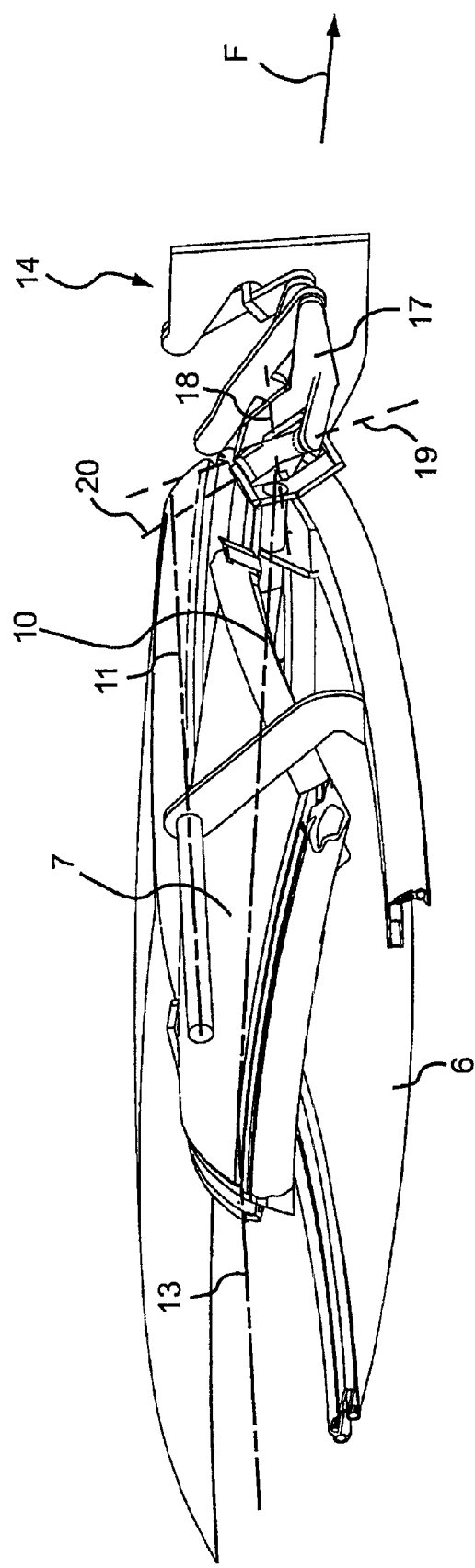
FIG. 28 is the roof, also showing the pivot axis of the C pillar and swivel axes of the rear roof element relative to the car body and of the roof elements relative to each other, in its opened position, somewhat corresponding to FIGS. 11 and 20, FIG. 29A and FIG. 29B are detail views of the upper and lower three-dimensional link mechanism in this position.
Figure 29A:
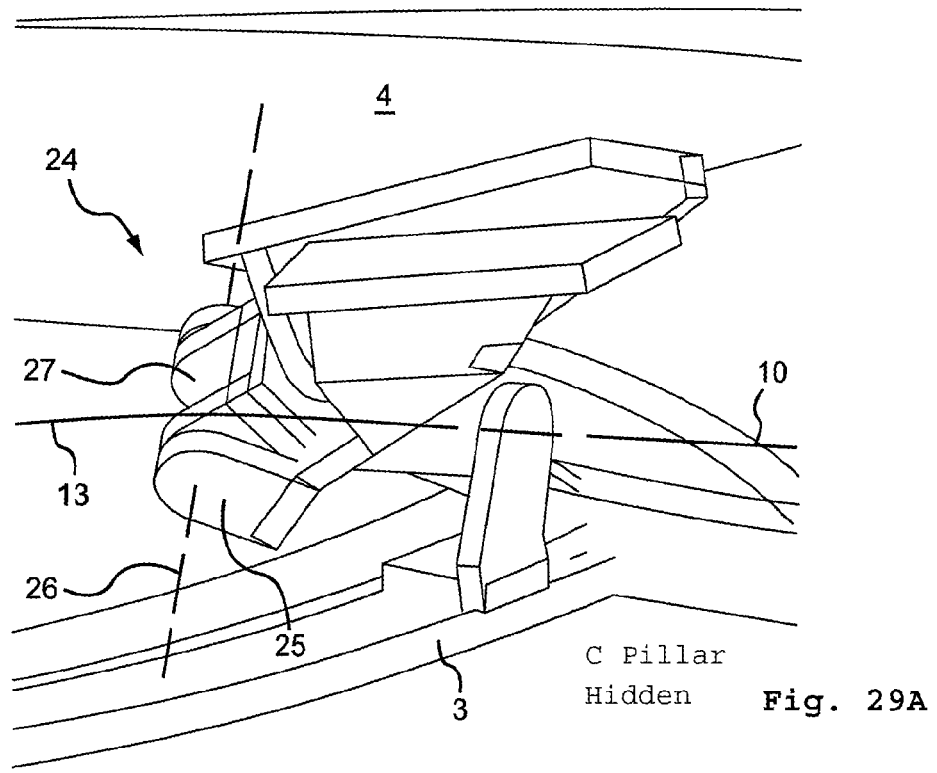
Figure 29B:
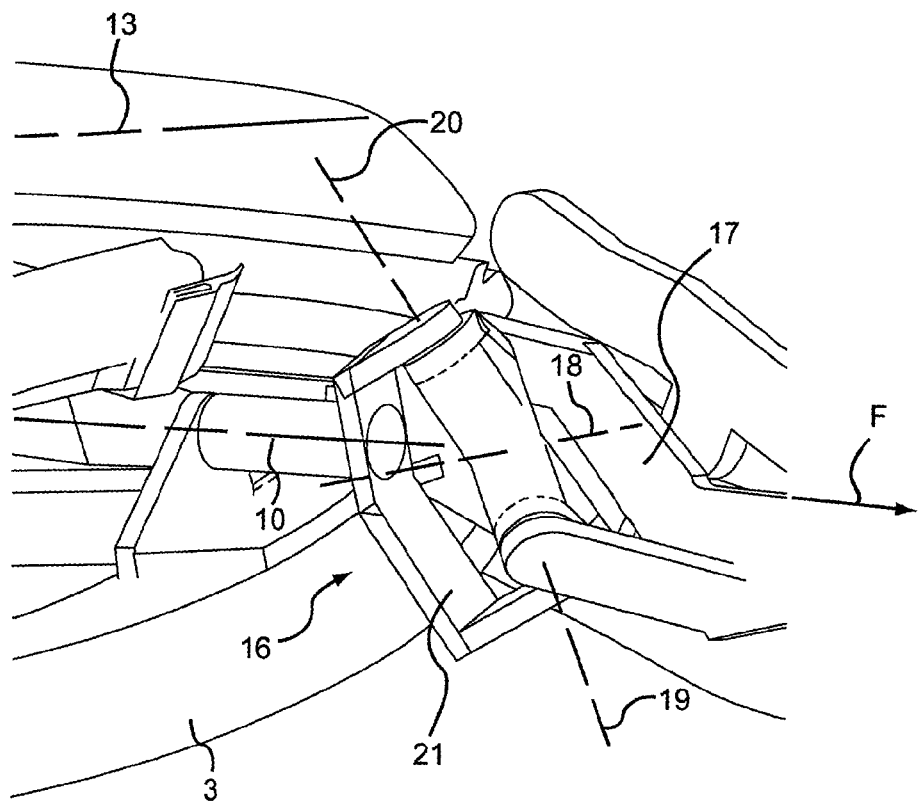

With the narrowing of the roof 2 by rotating the C pillars 7 inward during the opening, it is also possible to narrow the trunk cover D in any case. Now, its side edge no longer has to extend, as in the prior art, up to the joint R1 situated to the side outside of the entry gap for the C pillars, but rather it can end at the edge joint R2, moved closer to the center of the vehicle 8, leaving only a sufficient entry gap for the middle region 9 when the trunk cover D is open (FIG. 13), so that the design in the rear section is considerably improved.

While the best modes for carrying out the invention have been described in detail, those familiar with the art to which this invention relates will recognize various alternative designs and embodiments for practicing the invention within the scope of the appended claims.

The invention claimed is:

1. A convertible vehicle comprising:
a roof (2) including a front roof element (4) and a rear roof element (3) having a central segment (9), the front roof element (4) arranged upstream relative to the rear roof element (3) in a direction of travel (F) when the roof (2) is in a closed position, and the rear roof element (3) moveable at least essentially rearward and downward and the front roof element (4) swivelable toward the rear roof element (3) to move the rear roof element (3) and the front roof element (4) into an open position; and
at least one C pillar (7) coupled to and moveable with the rear roof element (3) and substantially located alongside the central segment (9);
the at least one C pillar (7) being swivelable inward in relation to the central segment (9) about a pivot axis (10) in response to movement of the rear roof element (3) from the closed position to the open position to position the at least one C pillar (7) within a space defined between the front roof element (4) and the rear roof element (3) when the roof is in the open position;
wherein the pivot axis (10) is parallel to a plane of the rear roof element (3).

2. A convertible vehicle (1) per claim 1, characterized in that the C pillars (7) are suspended from the center section (9).

3. A convertible vehicle (1) per claim 1, characterized in that the C pillars (7) can be supported between the roof elements (3; 4) in the opened position of the roof.

4. A convertible vehicle (1) per claim 1, characterized in that the pivot axes (10) of the C pillars (7) are enclosed for at least part of their region by drive shafts, so that the swiveling of the front roof element (4) can be mediated via the rotary movement of the C pillars (7), for which it can be translated into a swivel movement between the roof elements (3, 4) in the region of the joint (5) between them.

5. A convertible vehicle (1) per claim 4, characterized in that an upper three-dimensional link mechanism (24) is arranged to translate the rotary movement of the C pillars (7) into the swivel motion between the roof elements (3; 4).

6. A convertible vehicle (1) per claim 5, characterized in that a lower three-dimensional link mechanism (16) is provided to drive the rotary movement of the C pillars (7), translating a displacement motion of the rear roof element (3) into a rotary motion of the C pillars (7) about the axes (10).

7. A convertible vehicle (1) per claim 6, characterized in that the upper and/or the lower three-dimensional link mechanism (24; 16) are each configured as a spherical link mechanism.

8. A convertible vehicle (1) per claim 7, characterized in that the upper (24) and/or the lower three-dimensional link mechanism (16) each have at least one universal joint.

9. A convertible vehicle (1) per claim 1, characterized in that the rear roof element (3) can swivel about a first axis (11) lying transverse to the vehicle (1), the front roof element (4) can swivel relative to the rear roof element about a second axis (13) lying parallel to the latter, and the pivot axes (10) link both rotary movements together.

10. A convertible vehicle (1) per claim 1, characterized in that a single drive (15) is provided for the movement of the rear roof element (3) about a first axis (11) lying transverse to the vehicle (1), the front roof element (4) about a second axis (13), and for the rotary movement of the C pillars (7), which serves to produce the movement of the rear roof element (3) about a first axis (11) lying transverse to the vehicle (1).

11. A convertible vehicle (1) per claim 1, characterized in that similar structural relations exist on both sides of the vehicle.

12. A convertible vehicle (1) per claim 1, characterized in that the pivot axes (10) of the C pillars (7) have brackets (23) pointing toward the vertical longitudinal midplane of the vehicle in the upper and lower region, through which the pivot axes (10) travel, while the C pillars (7) run further on the outside with their edges facing the center of the vehicle (8) for a middle portion of their dimension in terms of the vertical, as compared to the brackets (23).

* * * * *